(12) United States Patent
Zhang

(10) Patent No.: US 12,225,399 B2
(45) Date of Patent: Feb. 11, 2025

(54) CHANNEL STATE INFORMATION TRANSMISSION METHOD AND APPARATUS

(71) Applicant: HUAWEI TECHNOLOGIES CO., LTD., Guangdong (CN)

(72) Inventor: Di Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/719,709

(22) Filed: Apr. 13, 2022

(65) Prior Publication Data

US 2022/0330069 A1   Oct. 13, 2022

Related U.S. Application Data

(63) Continuation of application No. PCT/CN2019/111332, filed on Oct. 15, 2019.

(51) Int. Cl.
*H04W 24/10* (2009.01)
*H04L 5/00* (2006.01)

(52) U.S. Cl.
CPC .......... *H04W 24/10* (2013.01); *H04L 5/0053* (2013.01)

(58) Field of Classification Search
CPC .................................................. H04W 24/10
See application file for complete search history.

(56) References Cited

U.S. PATENT DOCUMENTS

| | | | |
|---|---|---|---|
| 2019/0207722 A1* | 7/2019 | Gao | H04B 7/088 |
| 2019/0297603 A1 | 9/2019 | Guo et al. | |
| 2022/0345191 A1* | 10/2022 | Guo | H04B 7/0686 |
| 2023/0087391 A1* | 3/2023 | Elshafie | H04B 7/0404 |
| | | | 370/329 |

FOREIGN PATENT DOCUMENTS

| | | |
|---|---|---|
| CN | 108111286 A | 6/2018 |
| CN | 109151888 A | 1/2019 |
| WO | 2018199681 A1 | 11/2018 |
| WO | 2019095723 A1 | 5/2019 |

OTHER PUBLICATIONS

Extended European Search Report issued in European Application No. 19949485.7 on Sep. 9, 2022, 15 pages.
(Continued)

*Primary Examiner* — Shukri Taha
(74) *Attorney, Agent, or Firm* — Fish & Richardson P.C.

(57) ABSTRACT

One example method includes: When a network device indicates that a reporting type is group-based reporting, channel state information reported by a terminal device to the network device includes indexes of X first reference signal resources and Y pieces of channel quality information. Channel quality information of a $j^{th}$ first reference signal resource is determined based on the $j^{th}$ first reference signal resource and a second reference signal resource that has a first association relationship with the $j^{th}$ first reference signal resource.

12 Claims, 12 Drawing Sheets

(56) References Cited

OTHER PUBLICATIONS

Huawei, HiSilicon, "Summary of Remaining Issues for CSI Reporting," 3GPP TSG RAN WG1 Ad-Hoc Meeting, R1-1800095, Vancouver, Canada, Jan. 22-26, 2018, 8 pages.

Mediatek Inc., "Enhancements on multi-beam operations," 3GPP TSG RAN WG1 #96bis, R1-1904476, Xi'an, China, Apr. 8-12, 2019, 11 pages.

NTT DOCOMO, Inc., "Discussion on multi-beam enhancement," 3GPP TSG RAN WG1 #97, R1-1906225, Reno, USA, May 13-17, 2019, 24 pages.

PCT International Search Report and Written Opinion issued in International Application No. PCT/CN2019/111332 on Jul. 15, 2020, 15 pages (with English translation).

Vivo, "Remaining issues on beam measurement and reporting," 3GPP TSG RAN WG1 Meeting #93, R1-1806044, Busan, South Korea, May 21-25, 2018, 5 pages.

Office Action in Chinese Appln. No. 201980098127.2, dated May 9, 2023, 6 pages.

\* cited by examiner

CHANNEL STATE INFORMATION TRANSMISSION METHOD AND APPARATUS

CROSS-REFERENCE TO RELATED APPLICATIONS

This application is a continuation of International Application No. PCT/CN2019/111332, filed on Oct. 15, 2019, the disclosure of which is hereby incorporated by reference in its entirety.

TECHNICAL FIELD

Embodiments of this application relate to the communication field, and in particular, to a channel state information transmission method and an apparatus.

BACKGROUND

To cope with explosive mobile data traffic growth, massive mobile communication device connections, and continuous emergence of various new services and application scenarios in the future, a fifth generation (fifth generation, 5G) mobile communication system emerges. The 5G mobile communication system is also referred to as a new radio access technology (new radio access technology, NR) system.

In the NR system, to monitor a beam change in a radio signal transmission process, a terminal device measures communication quality of a plurality of beams (namely, reference signals) configured by a network device, and reports information about a beam having good communication quality to the network device. In consideration of impact of an interference factor on a beam, for the purpose of selecting a beam having better communication quality, the network device may configure, for the terminal device, an interference measurement resource (interference measurement resource, IMR) used for interference measurement, so that the terminal device measures interference of a corresponding beam, and selects the beam having better communication quality.

In a conventional technology, if a reporting configuration (for example, a channel state information reporting configuration (Channel state information ReportConfig, CSI-ReportConfig)) configured by the network device indicates that a group-based beam reporting (groupBasedBeamReporting) parameter is configured to enabled (enabled), the network device indicates the terminal device to report information (for example, reference signal resource indexes and/or reference signal resource channel quality) of reference signals that can be received simultaneously. When configuring the interference measurement resource, the network device cannot learn of channel measurement resources (channel measurement resources, CMRs) that can be received simultaneously. Therefore, the terminal device cannot measure, based on the interference measurement resource that is configured by the network device and that is associated with a channel measurement resource, interference between the channel measurement resources that are received simultaneously, and interference information obtained through measurement is inaccurate.

SUMMARY

Embodiments of this application provide a channel state information transmission method and an apparatus, to resolve a problem that interference obtained through measurement performed by a terminal device based on an interference measurement resource associated with a channel measurement resource is inaccurate.

To achieve the foregoing objective, the following technical solutions are used in embodiments of this application.

According to a first aspect, a channel state information transmission method is provided. The method may be applied to a terminal device, or the method may be applied to a communication apparatus that can support the terminal device in implementing the method. For example, the communication apparatus includes a chip system. The method includes: receiving reporting configuration information, and sending channel state information, where the reporting configuration information is used to indicate a reporting type, and the reporting type is used to indicate group-based reporting; and the channel state information includes indexes of X first reference signal resources and Y pieces of channel quality information, X is an integer greater than or equal to 2, and Y is an integer greater than or equal to 1, where for a $j^{th}$ first reference signal resource, channel quality information of the $j^{th}$ first reference signal resource is determined based on the $j^{th}$ first reference signal resource and a second reference signal resource that has a first association relationship with the $j^{th}$ first reference signal resource, the $j^{th}$ first reference signal resource is one of the X first reference signal resources, and j is an integer greater than or equal to 1 and less than or equal to X; and the second reference signal resource that has the first association relationship with the $j^{th}$ first reference signal resource is determined based on a first reference signal resource received simultaneously with the $j^{th}$ first reference signal resource, and the first reference signal resource received simultaneously with the $j^{th}$ first reference signal resource is a resource in the X first reference signal resources.

According to the channel state information transmission method provided in embodiments of this application, for a channel measurement resource that is received when interference exists, the terminal device measures interference on the channel measurement resource based on a reference signal resource associated with at least one other channel measurement resource that can be received simultaneously with the channel measurement resource, to obtain more accurate interference information.

In a possible implementation, that the second reference signal resource that has the first association relationship with the $j^{th}$ first reference signal resource is determined based on a first reference signal resource received simultaneously with the $j^{th}$ first reference signal resource includes: The second reference signal resource that has the first association relationship with the $j^{th}$ first reference signal resource is determined based on a second reference signal resource that has a second association relationship with the simultaneously received first reference signal resource, and the simultaneously received first reference signal resource is the first reference signal resource received simultaneously with the $j^{th}$ first reference signal resource.

Because the second reference signal resource that has the second association relationship with the first reference signal resource may be used to estimate power information on the first reference signal resource, when the first reference signal resource is used as interference, the second reference signal resource that has the second association relationship with the first reference signal resource may simulate an interference signal. Therefore, more accurate interference information is obtained.

In another possible implementation, the $j^{th}$ first reference signal resource and the second reference signal resource that has the first association relationship with the $j^{th}$ first reference signal resource satisfy a quasi-colocation (Quasi-colocation, QCL) relationship.

In another possible implementation, the reporting configuration information is further used to indicate a first reference signal resource set and L second reference signal resource sets, the first reference signal resource set includes M first reference signal resources, the first reference signal resource is used for channel measurement, an $i^{th}$ second reference signal resource set includes $N_i$ second reference signal resources, and the second reference signal resource is used for interference measurement, where M is an integer greater than 1, L is an integer greater than or equal to 1, i is an integer greater than or equal to 1 and less than or equal to L, and $N_i$ is an integer greater than or equal to 1.

In another possible implementation, the second association relationship exists between a $k^{th}$ first reference signal resource in the M first reference signal resources and at least one second reference signal resource in the L second reference signal resource sets, where k is an integer greater than or equal to 1 and less than or equal to M.

In another possible implementation, the second reference signal resource that has the second association relationship with the $k^{th}$ first reference signal resource is a zero-power second reference signal resource, and positions of the $k^{th}$ first reference signal resource and the second reference signal resource that has the second association relationship with the $k^{th}$ first reference signal resource partially or completely overlap.

Optionally, that positions partially overlap may mean that frequency domain parts partially overlap, time domain parts partially overlap, or frequency domain and time domain parts partially overlap.

Optionally, that positions completely overlap may mean that frequency domain parts completely overlap, time domain parts completely overlap, or frequency domain and time domain parts completely overlap.

In another possible implementation, the second reference signal resource that has the second association relationship with the $k^{th}$ first reference signal resource is a non-zero-power second reference signal resource, and the $k^{th}$ first reference signal resource and the second reference signal resource that has the second association relationship with the $k^{th}$ first reference signal resource use a same downlink spatial transmission filter.

In another possible implementation, the second association relationship exists between the $k^{th}$ first reference signal resource and a $k^{th}$ second reference signal resource, the $k^{th}$ second reference signal resource is a $k^{th}$ second reference signal resource in the $N_i$ second reference signal resources included in the $i^{th}$ second reference signal resource set, and $M=N_i$.

In another possible implementation, the second association relationship exists between the $k^{th}$ first reference signal resource and a $k^{th}$ second reference signal resource set, and $M=L$.

In another possible implementation, the second reference signal resource that has the first association relationship with the $j^{th}$ first reference signal resource is a channel state information-interference measurement (Channel state information-interference measurement, CSI-IM) resource, and the method further includes: determining a first signal power and a second signal power, where the first signal power is obtained based on a signal power on the $j^{th}$ first reference signal resource, and the second signal power is obtained based on an average value of receive powers of CSI-IM on second reference signal resources that have the first association relationship with the $j^{th}$ first reference signal resource; and determining the channel quality information based on the first signal power and the second signal power.

In another possible implementation, the first signal power is the signal power on the $j^{th}$ first reference signal resource; and/or the second signal power is the average value of the receive powers of the CSI-IM on the second reference signal resources that have the first association relationship with the $j^{th}$ first reference signal resource.

In another possible implementation, the second reference signal resource that has the first association relationship with the $j^{th}$ first reference signal resource is a non-zero-power channel state information-reference signal (Non-Zero-Power Channel State Information-Reference Signal, NZP CSI-RS) resource, and the method further includes: determining a first signal power and a second signal power, where the first signal power is obtained based on a signal power on the $j^{th}$ first reference signal resource, and the second signal power is obtained based on a sum of signal powers of NZP CSI-RSs on second reference signal resources that have the first association relationship with the $j^{th}$ first reference signal resource; and determining the channel quality information based on the first signal power and the second signal power.

In another possible implementation, the first signal power is the signal power on the $j^{th}$ first reference signal resource; and/or the second signal power is the sum of the signal powers of the NZP CSI-RSs on the second reference signal resources that have the first association relationship with the $j^{th}$ first reference signal resource.

In another possible implementation, L is greater than 1, the second reference signal resource that has the first association relationship with the $j^{th}$ first reference signal resource includes an NZP CSI-RS resource and a CSI-IM resource, and the method further includes: determining a first signal power and a second signal power, where the first signal power is obtained based on a signal power on the $j^{th}$ first reference signal resource, and the second signal power is obtained based on a receive power of CSI-IM and a signal power of an NZP CSI-RS on the second reference signal resource that has the first association relationship with the $j^{th}$ first reference signal resource; and determining the channel quality information based on the first signal power and the second signal power.

In another possible implementation, the first signal power is the signal power on the $j^{th}$ first reference signal resource; and/or the second signal power is a sum of the receive power of the CSI-IM and the signal power of the NZP CSI-RS on the second reference signal resource that has the first association relationship with the $j^{th}$ first reference signal resource.

In another possible implementation, the first reference signal resource is an NZP CSI-RS resource or a synchronization signal/physical broadcast channel block (synchronization signal/PBCH block, SSB) resource.

According to a second aspect, a channel state information transmission method is provided. The method may be applied to a network device, or the method may be applied to a communication apparatus that can support the network device in implementing the method. For example, the communication apparatus includes a chip system. The method includes: sending reporting configuration information, and receiving channel state information, where the reporting configuration information is used to indicate a reporting type, and the reporting type is used to indicate group-based reporting; and the channel state information includes indexes of X first reference signal resources and Y pieces of channel quality information, X is an integer greater than or equal to 2, and Y is an integer greater than or equal to 1, where channel quality information of a $j^{th}$ first reference signal resource is determined based on the $j^{th}$ first reference signal resource and a second reference signal resource that has a first association relationship with the $j^{th}$ first reference signal resource, and the $j^{th}$ first reference signal resource is one of the X first reference signal resources; and the second reference signal resource that has the first association relationship with the $j^{th}$ first reference signal resource is determined based on a first reference signal resource reported in a same group as the $j^{th}$ first reference signal resource, and the first reference signal resource reported in the same group as the $j^{th}$ first reference signal resource is a resource in the X first reference signal resources.

According to the channel state information transmission method provided in embodiments of this application, for a channel measurement resource that is received when interference exists, a terminal device measures interference on the channel measurement resource based on a reference signal resource associated with at least one other channel measurement resource that can be received simultaneously with the channel measurement resource, so that the network device can obtain more accurate interference information.

In a possible implementation, that the second reference signal resource that has the first association relationship with the $j^{th}$ first reference signal resource is determined based on a first reference signal resource reported in a same group as the $j^{th}$ first reference signal resource includes: The second reference signal resource that has the first association relationship with the $j^{th}$ first reference signal resource is determined based on a second reference signal resource that has a second association relationship with the first reference signal resource reported in the same group, and the first reference signal resource reported in the same group is the first reference signal resource reported in the same group as the $j^{th}$ first reference signal resource.

In another possible implementation, the $j^{th}$ first reference signal resource and the second reference signal resource that has the first association relationship with the $j^{th}$ first reference signal resource satisfy a QCL relationship.

In another possible implementation, the reporting configuration information is further used to indicate a resource configuration, the resource configuration is used to indicate a first reference signal resource set and L second reference signal resource sets, the first reference signal resource set includes M first reference signal resources, the first reference signal resource is used for channel measurement, an $i^{th}$ second reference signal resource set includes $N_i$ second reference signal resources, and the second reference signal resource is used for interference measurement, where M is an integer greater than 1, L is an integer greater than or equal to 1, i is an integer greater than or equal to 1 and less than or equal to L, and $N_i$ is an integer greater than or equal to 1.

In another possible implementation, the second association relationship exists between a $k^{th}$ first reference signal resource in the M first reference signal resources and at least one second reference signal resource in the L second reference signal resource sets, where k is an integer greater than or equal to 1 and less than or equal to M.

In another possible implementation, the second reference signal resource that has the second association relationship with the $k^{th}$ first reference signal resource is a zero-power second reference signal resource, and positions of the $k^{th}$ first reference signal resource and the second reference signal resource that has the second association relationship with the $k^{th}$ first reference signal resource partially or completely overlap.

In another possible implementation, the second reference signal resource that has the second association relationship with the $k^{th}$ first reference signal resource is a non-zero-power second reference signal resource, and the $k^{th}$ first reference signal resource and the second reference signal resource that has the second association relationship with the $k^{th}$ first reference signal resource use a same downlink spatial transmission filter.

In another possible implementation, the second association relationship exists between the $k^{th}$ first reference signal resource and a $k^{th}$ second reference signal resource, the $k^{th}$ second reference signal resource is a $k^{th}$ second reference signal resource in the $N_i$ second reference signal resources included in the $i^{th}$ second reference signal resource set, and $M=N_i$.

In another possible implementation, the second association relationship exists between the $k^{th}$ first reference signal resource and a $k^{th}$ second reference signal resource set, and $M=L$.

In another possible implementation, the first reference signal resource is an NZP CSI-RS resource or an SSB resource.

According to a third aspect, a communication apparatus is further provided. For beneficial effects, refer to descriptions in the first aspect. Details are not described herein again. The communication apparatus has a function of implementing behavior in the method example in the first aspect. The function may be implemented by hardware, or may be implemented by hardware by executing corresponding software. The hardware or the software includes one or more modules corresponding to the foregoing function. In a possible design, the communication apparatus includes a transceiver unit. The transceiver unit is configured to receive reporting configuration information, where the reporting configuration information is used to indicate a reporting type, and the reporting type is used to indicate group-based reporting. The transceiver unit is further configured to send channel state information, where the channel state information includes indexes of X first reference signal resources and Y pieces of channel quality information, X is an integer greater than or equal to 2, and Y is an integer greater than or equal to 1. Channel quality information of $j^{th}$ first reference signal resource is determined based on the $j^{th}$ first reference signal resource and a second reference signal resource that has a first association relationship with the $j^{th}$ first reference signal resource, the $j^{th}$ first reference signal resource is one of the X first reference signal resources, and j is an integer greater than or equal to 1 and less than or equal to X. The second reference signal resource that has the first association relationship with the $j^{th}$ first reference signal resource is determined based on a first reference signal resource received simultaneously with the $j^{th}$ first reference signal resource, and the first reference signal resource received simultaneously with the $j^{th}$ first reference signal resource is a resource in the X first reference signal resources.

In a possible implementation, that the second reference signal resource that has the first association relationship with the $j^{th}$ first reference signal resource is determined based on a first reference signal resource received simultaneously with the $j^{th}$ first reference signal resource includes: The second reference signal resource that has the first association relationship with the $j^{th}$ first reference signal resource is determined based on a second reference signal resource that has a second association relationship with the simultaneously received first reference signal resource, and the simultaneously received first reference signal resource is a first reference signal resource received simultaneously with the $j^{th}$ first reference signal resource.

In another possible implementation, the $j^{th}$ first reference signal resource and the second reference signal resource that has the first association relationship with the $j^{th}$ first reference signal resource satisfy a QCL relationship.

In another possible implementation, the reporting configuration information is further used to indicate a first reference signal resource set and L second reference signal resource sets, the first reference signal resource set includes M first reference signal resources, the first reference signal resource is used for channel measurement, an $i^{th}$ second reference signal resource set includes $N_i$ second reference signal resources, and the second reference signal resource is used for interference measurement, where M is an integer greater than 1, L is an integer greater than or equal to 1, i is an integer greater than or equal to 1 and less than or equal to L, and $N_i$ is an integer greater than or equal to 1.

In another possible implementation, the second association relationship exists between a $k^{th}$ first reference signal resource in the M first reference signal resources and at least one second reference signal resource in the L second reference signal resource sets, where k is an integer greater than or equal to 1 and less than or equal to M.

In another possible implementation, the second reference signal resource that has the second association relationship with the $k^{th}$ first reference signal resource is a zero-power second reference signal resource, and positions of the $k^{th}$ first reference signal resource and the second reference signal resource that has the second association relationship with the $k^{th}$ first reference signal resource partially or completely overlap.

In another possible implementation, the second reference signal resource that has the second association relationship with the $k^{th}$ first reference signal resource is a non-zero-power second reference signal resource, and the $k^{th}$ first reference signal resource and the second reference signal resource that has the second association relationship with the $k^{th}$ first reference signal resource use a same downlink spatial transmission filter.

In another possible implementation, the second association relationship exists between the $k^{th}$ first reference signal resource and a $k^{th}$ second reference signal resource, the $k^{th}$ second reference signal resource is a $k^{th}$ second reference signal resource in the $N_i$ second reference signal resources included in the $i^{th}$ second reference signal resource set, and $M=N_i$.

In another possible implementation, the second association relationship exists between the $k^{th}$ first reference signal resource and a $k^{th}$ second reference signal resource set, and $M=L$.

In another possible implementation, the second reference signal resource that has the first association relationship with the $j^{th}$ first reference signal resource is a CSI-IM resource, and the apparatus further includes a processing unit. The processing unit is configured to determine a first signal power and a second signal power, where the first signal power is obtained based on a signal power on the $j^{th}$ first reference signal resource, and the second signal power is obtained based on an average value of receive powers of CSI-IM on second reference signal resources that have the first association relationship with the $j^{th}$ first reference signal resource. The processing unit is further configured to determine the channel quality information based on the first signal power and the second signal power.

In another possible implementation, the first signal power is the signal power on the $j^{th}$ first reference signal resource; and/or the second signal power is the average value of the receive powers of the CSI-IM on the second reference signal resources that have the first association relationship with the $j^{th}$ first reference signal resource.

In another possible implementation, the second reference signal resource that has the first association relationship with the $j^{th}$ first reference signal resource is an NZP CSI-RS resource, and the apparatus further includes a processing unit. The processing unit is configured to determine a first signal power and a second signal power, where the first signal power is obtained based on a signal power on the $j^{th}$ first reference signal resource, and the second signal power is obtained based on a sum of signal powers of NZP CSI-RSs on second reference signal resources that have the first association relationship with the $j^{th}$ first reference signal resource. The processing unit is further configured to determine the channel quality information based on the first signal power and the second signal power.

In another possible implementation, the first signal power is the signal power on the $j^{th}$ first reference signal resource; and/or the second signal power is the sum of the signal powers of the NZP CSI-RSs on the second reference signal resources that have the first association relationship with the $j^{th}$ first reference signal resource.

In another possible implementation, L is greater than 1, the second reference signal resource that has the first association relationship with the $j^{th}$ first reference signal resource includes an NZP CSI-RS resource and a CSI-IM resource, and the apparatus further includes a processing unit. The processing unit is configured to determine a first signal power and a second signal power, where the first signal power is obtained based on a signal power on the $j^{th}$ first reference signal resource, and the second signal power is obtained based on a receive power of CSI-IM and a signal power of an NZP CSI-RS on the second reference signal resource that has the first association relationship with the $j^{th}$ first reference signal resource. The processing unit is further configured to determine the channel quality information based on the first signal power and the second signal power.

In another possible implementation, the first signal power is the signal power on the $j^{th}$ first reference signal resource; and/or the second signal power is a sum of the receive power of the CSI-IM and the signal power of the NZP CSI-RS on the second reference signal resource that has the first association relationship with the $j^{th}$ first reference signal resource.

In another possible implementation, the first reference signal resource is an NZP CSI-RS resource or an SSB resource.

According to a fourth aspect, a communication apparatus is further provided. For beneficial effects, refer to descriptions in the second aspect. Details are not described herein again. The communication apparatus has a function of implementing behavior in the method example in the second aspect. The function may be implemented by hardware, or may be implemented by hardware by executing corresponding software. The hardware or the software includes one or more modules corresponding to the foregoing function. In a possible design, the communication apparatus includes a transceiver unit. The transceiver unit is configured to send reporting configuration information, where the reporting configuration information is used to indicate a reporting type, and the reporting type is used to indicate group-based reporting. The transceiver unit is further configured to receive channel state information, where the channel state information includes indexes of X first reference signal resources and Y pieces of channel quality information, X is an integer greater than or equal to 2, and Y is an integer greater than or equal to 1. Channel quality information of a $j^{th}$ first reference signal resource is determined based on the $j^{th}$ first reference signal resource and a second reference signal resource that has a first association relationship with the $j^{th}$ first reference signal resource, and the $i^{th}$ first reference signal resource is one of the X first reference signal resources. The second reference signal resource that has the first association relationship with the $j^{th}$ first reference signal resource is determined based on a first reference signal resource reported in a same group as the $j^{th}$ first reference signal resource, and the first reference signal resource reported in the same group as the $i^{th}$ first reference signal resource is a resource in the X first reference signal resources.

In a possible implementation, that the second reference signal resource that has the first association relationship with the $j^{th}$ first reference signal resource is determined based on a first reference signal resource reported in a same group as the $j^{th}$ first reference signal resource includes: The second reference signal resource that has the first association relationship with the $i^{th}$ first reference signal resource is determined based on a second reference signal resource that has a second association relationship with the first reference signal resource reported in the same group, and the first reference signal resource reported in the same group is the first reference signal resource reported in the same group as the $j^{th}$ first reference signal resource.

In another possible implementation, the $j^{th}$ first reference signal resource and the second reference signal resource that has the first association relationship with the $j^{th}$ first reference signal resource satisfy a QCL relationship.

In another possible implementation, the reporting configuration information is further used to indicate a resource configuration, the resource configuration is used to indicate a first reference signal resource set and L second reference signal resource sets, the first reference signal resource set includes M first reference signal resources, the first reference signal resource is used for channel measurement, an $i^{th}$ second reference signal resource set includes $N_i$ second reference signal resources, and the second reference signal resource is used for interference measurement, where M is an integer greater than 1, L is an integer greater than or equal to 1, i is an integer greater than or equal to 1 and less than or equal to L, and $N_i$ is an integer greater than or equal to 1.

In another possible implementation, the second association relationship exists between a $k^{th}$ first reference signal resource in the M first reference signal resources and at least one second reference signal resource in the L second reference signal resource sets, where k is an integer greater than or equal to 1 and less than or equal to M.

In another possible implementation, the second reference signal resource that has the second association relationship with the $k^{th}$ first reference signal resource is a zero-power second reference signal resource, and positions of the $k^{th}$ first reference signal resource and the second reference signal resource that has the second association relationship with the $k^{th}$ first reference signal resource partially or completely overlap.

In another possible implementation, the second reference signal resource that has the second association relationship with the $k^{th}$ first reference signal resource is a non-zero-power second reference signal resource, and the $k^{th}$ first reference signal resource and the second reference signal resource that has the second association relationship with the $k^{th}$ first reference signal resource use a same downlink spatial transmission filter.

In another possible implementation, the second association relationship exists between the $k^{th}$ first reference signal resource and a $k^{th}$ second reference signal resource, the $k^{th}$ second reference signal resource is a $k^{th}$ second reference signal resource in the $N_i$ second reference signal resources included in the $i^{th}$ second reference signal resource set, and $M=N_i$.

In another possible implementation, the second association relationship exists between the $k^{th}$ first reference signal resource and a $k^{th}$ second reference signal resource set, and $M=L$.

According to a fifth aspect, a communication apparatus is further provided. The communication apparatus may be the terminal device in the foregoing method embodiment or a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiment. Specifically, the communication interface is configured to receive reporting configuration information, where the reporting configuration information is used to indicate a reporting type, and the reporting type is used to indicate group-based reporting. The communication interface is further configured to send channel state information, where the channel state information includes indexes of X first reference signal resources and Y pieces of channel quality information, X is an integer greater than or equal to 2, and Y is an integer greater than or equal to 1. Channel quality information of a $j^{th}$ first reference signal resource is determined based on the $j^{th}$ first reference signal resource and a second reference signal resource that has a first association relationship with the $j^{th}$ first reference signal resource, the $j^{th}$ first reference signal resource is one of the X first reference signal resources, and j is an integer greater than or equal to 1 and less than or equal to X. The second reference signal resource that has the first association relationship with the $j^{th}$ first reference signal resource is determined based on a first reference signal resource received simultaneously with the $j^{th}$ first reference signal resource, and the first reference signal resource received simultaneously with the $j^{th}$ first reference signal resource is a resource in the X first reference signal resources. The communication interface and the processor may perform corresponding functions in the method example in the first aspect. For details, refer to detailed descriptions in the method example. Details are not described herein again.

According to a sixth aspect, a communication apparatus is further provided. The communication apparatus may be the network device in the foregoing method embodiment or a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiment. Specifically, the communication interface is configured to send reporting configuration information, where the reporting configuration information is used to indicate a reporting type, and the reporting type is used to indicate group-based reporting. The communication interface is further configured to receive channel state information, where the channel state information includes indexes of X first reference signal resources and Y pieces of channel quality information, X is an integer greater than or equal to 2, and Y is an integer greater than or equal to 1, where channel quality information of a $j^{th}$ first reference signal resource is determined based on the $j^{th}$ first reference signal resource and a second reference signal resource that has a first association relationship with the $j^{th}$ first reference signal resource, and the $j^{th}$ first reference signal resource is one of the X first reference signal resources; and the second reference signal resource that has the first association relationship with the $j^{th}$ first reference signal resource is determined based on a first reference signal resource reported in a same group as the $j^{th}$ first reference signal resource, and the first reference signal resource reported in the same group as the $j^{th}$ first reference signal resource is a resource in the X first reference signal resources. The communication interface and the processor may perform corresponding functions in the method example in the second aspect. For details, refer to detailed descriptions in the method example. Details are not described herein again.

According to a seventh aspect, a computer program product is provided. The computer program product includes computer program code. When the computer program code is run, the method performed by the terminal device in the foregoing aspects is performed.

According to an eighth aspect, a computer program product is provided. The computer program product includes computer program code. When the computer program code is run, the method performed by the network device in the foregoing aspects is performed.

According to a ninth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a tenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to an eleventh aspect, this application provides a computer-readable storage medium. The computer-readable storage medium stores a computer program. When the computer program is run, the method performed by the terminal device in the foregoing aspects is implemented.

According to a twelfth aspect, this application provides a computer-readable storage medium. The computer-readable storage medium stores a computer program. When the computer program is run, the method performed by the network device in the foregoing aspects is implemented.

In this application, names of the terminal device, the network device, and the communication apparatus constitute no limitation on the devices. During actual implementation, the devices may have other names. Provided that functions of the devices are similar to those of the devices in this application, the devices fall within the scope of the claims of this application and equivalent technologies thereof.

DESCRIPTION OF EMBODIMENTS

Figure 1:
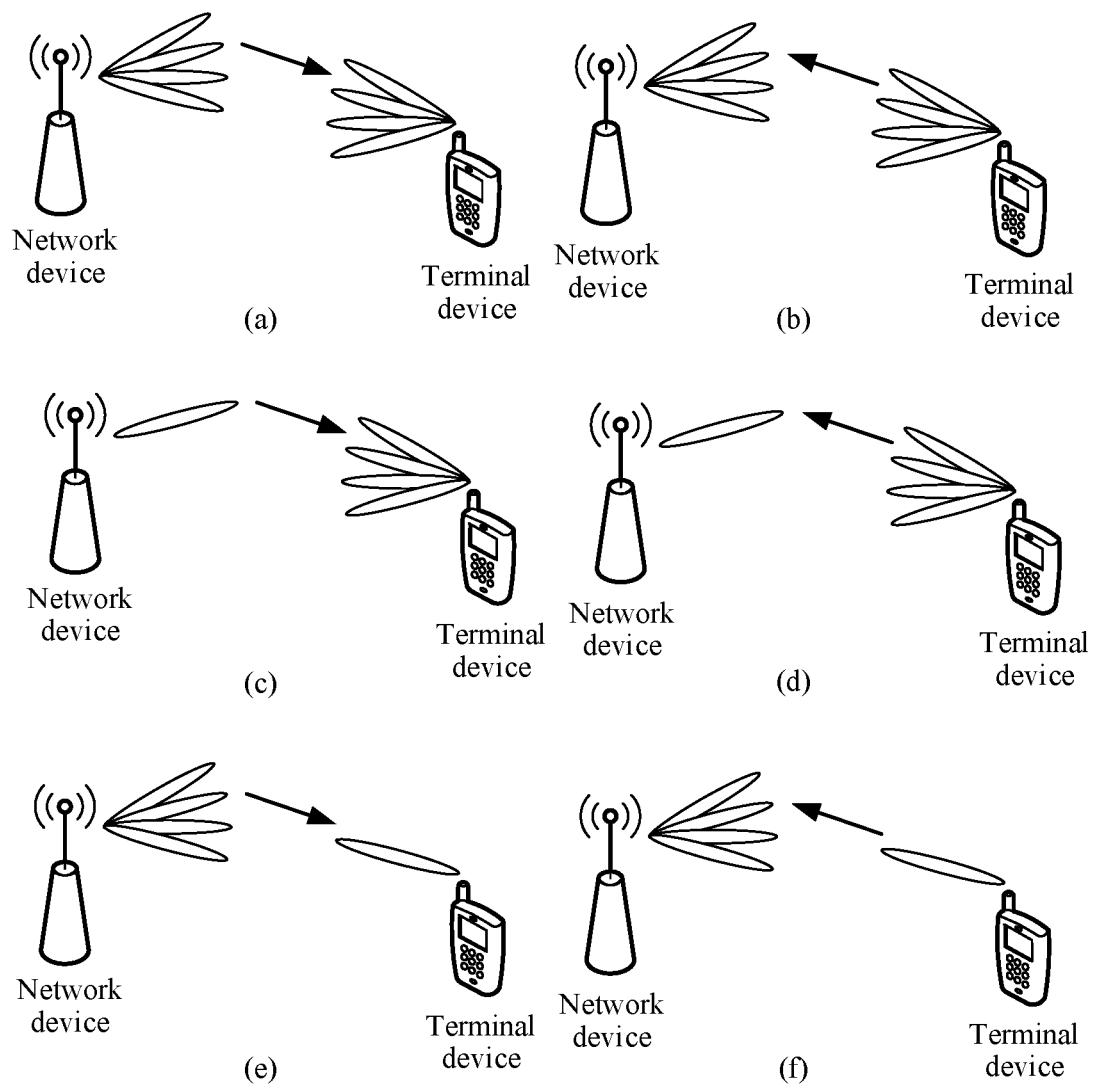
FIG. 1 is an example diagram of beam training according to a conventional technology.

In this specification, claims, and accompanying drawings of this application, the terms "first", "second", "third", and the like are intended to distinguish between different objects but do not limit a particular order.

In addition, in embodiments of this application, the word "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word such as "example" or "for example" is intended to present a related concept in a specific manner.

For clear and concise description of the following embodiments, brief descriptions of related technologies are first provided.

In an NR system, a radio signal may be transmitted between a network device and a terminal device by using a multi-antenna technology. Therefore, coverage of the radio signal can be expanded, and communication experience of a user can be improved. In addition, to satisfy a requirement of the user for a system capacity, the radio signal may be transmitted between the network device and the terminal device based on a high frequency band. When the radio signal is transmitted by using the high frequency band, because a frequency is increased, an antenna spacing is reduced. For a same quantity of antennas, an antenna panel of a smaller size may be used compared with an antenna panel used when the radio signal is transmitted by using a low frequency band. Therefore, a size of a multi-antenna configuration can be reduced. This facilitates obtaining of a site position of the network device and deployment information of more antennas. However, different from an operating frequency band of a system such as long term evolution (Long Term Evolution, LTE), in a process of transmitting the radio signal based on the high frequency band, a path loss (path loss) of the radio signal is further increased. In particular, factors such as the atmosphere and vegetation aggravate a loss of radio propagation. The path loss may also be referred to as a propagation loss. The path loss refers to a loss caused by filtering the signal by air during radio wave propagation in space. The path loss is an amount of a loss introduced by a propagation environment between a transmitter and a receiver. That is, the path loss is caused by radiation diffusion of a transmit power and a propagation characteristic of a channel, and reflects a change of an average value of received signal powers in a macroscopic range. Theoretically, path losses are also the same for same transmit and receive distances. However, during actual application, receive powers at different receive points with same transmit and receive distances change greatly, and even a receive power at a same receive point also fluctuates greatly at different time points.

To compensate for the path loss, a signal transmission mechanism based on a beamforming (Beamforming) technology is introduced. To be specific, a signal transmit power is increased by increasing an antenna gain, to compensate for the path loss in the process of transmitting the radio signal between the network device and the terminal device by using the high frequency band. Beamforming may also be referred to as beamforming or spatial domain filtering. Beamforming is a signal processing technology that uses a sensor array for directional signal sending and receiving. In the beamforming technology, a parameter of a basic unit of a phase array is adjusted, so that signals at some angles experience constructive interference while signals at the other angles experience destructive interference. Beamforming can be used at both a signal transmit end and a signal receive end.

When the radio signal is transmitted based on the beamforming technology, after the user moves, a direction of a shaped beam corresponding to the radio signal may no longer match a position that is of the user and that is after the user moves. Consequently, receiving of the signal is frequently interrupted. To reduce a change of the shaped beam in the process of transmitting the radio signal, before transmitting data, the terminal device may first perform beam training, to select a beam pair (beam pair link, BPL) having good communication quality. One beam pair includes one transmit beam of the network device and one receive beam of the terminal device, or one beam pair includes one transmit beam of the terminal device and one receive beam of the network device. The beam pair may be represented as <Bx, B'x>, where Bx represents the transmit beam of the network device, and B'x represents the receive beam of the terminal device. The beam pair may alternatively be represented as <By, B'y>, where By represents the transmit beam of the terminal device, and B'y represents the receive beam of the network device. Beam alignment may also be referred to as beam training.

Beam alignment may include downlink beam alignment and uplink beam alignment. The downlink beam alignment means that the terminal device selects the transmit beam of the network device and/or the receive beam of the terminal device based on beam sweeping performed by the network device, as shown in (a) in FIG. 1. The uplink beam alignment means that the network device selects the transmit beam of the terminal device and/or the receive beam of the network device based on beam sweeping performed by the terminal device, as shown in (b) in FIG. 1. The beam sweeping refers to a process of sending reference signals by using different transmit beams.

It should be understood that the downlink beam alignment means that the terminal device measures channel quality of a plurality of beams sent by the network device, selects a beam having good channel quality from the plurality of beams, and reports channel state information (Channel State Information, CSI) to the network device. The channel state information may include a beam index and a reference signal received power (Reference signal received power, RSRP) of a beam. For example, the terminal device may report the channel state information to the network device through a physical uplink control channel (Physical Uplink Control Channel, PUCCH) or a physical uplink shared channel (Physical Uplink Shared Channel, PUSCH). The channel state information may also be referred to as beam state information (Beam state information, BSI) or beam indication information. It may be understood that, measurement on channel quality of a beam is measurement based on a synchronization signal or a cell-specific reference signal (Cell-specific Reference Signal, CRS) obtained through beamforming.

For example, a process of the downlink beam alignment may include: The network device sends one or more reference signals to the terminal device by using each transmit beam, where resource multiplexing (for example, time domain and/or frequency domain resource multiplexing is performed in a manner of time division, frequency division, code division, or a combination thereof) may be performed between reference signals sent by using different transmit beams. The terminal device receives, by using each of a plurality of receive beams, the reference signal sent by each transmit beam of the network device, then estimates, based on the plurality of received reference signals, channel quality from each transmit beam of the network device to each receive beam of the terminal device, determines a beam pair whose channel quality satisfies a preset condition, and feeds back, to the network device, information (which may also be referred to as beam indication information) that is for indicating a transmit beam and that is in the beam pair. Subsequently, the network device may send a control channel, a data channel, a sounding reference signal (Sounding Reference Signal, SRS), or the like by using the transmit beam in the beam pair, and the terminal device may receive, by using a receive beam in the beam pair, the control channel, the data channel, the sounding reference signal, or the like that is sent by the network device.

Figure 2:
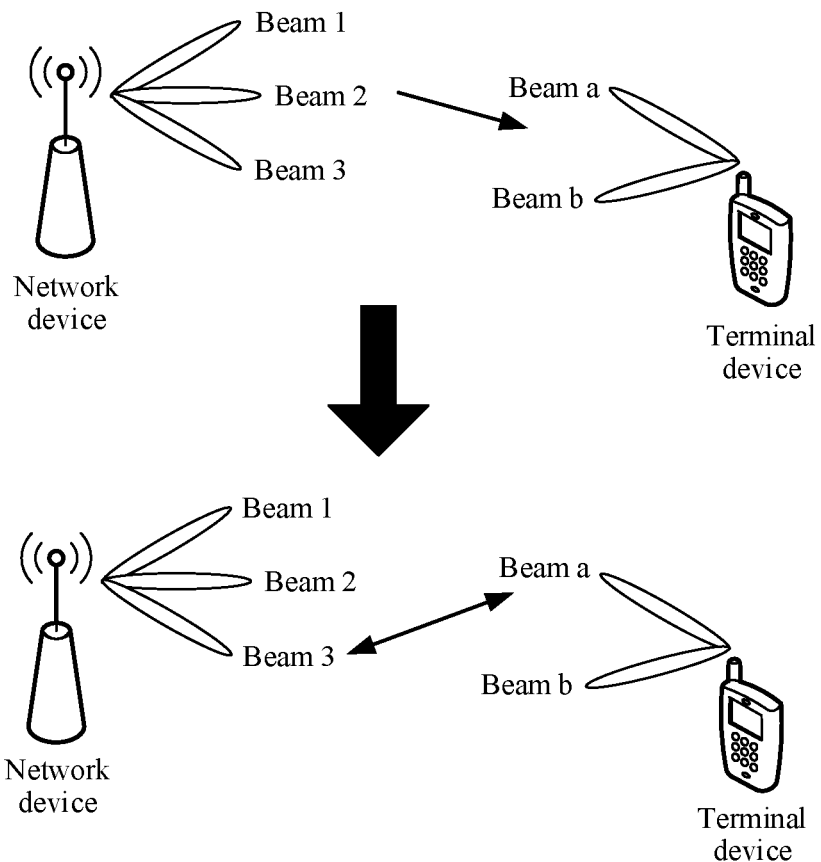
FIG. 2 is an example diagram of another beam training according to a conventional technology.

As shown in FIG. 2, it is assumed that the network device may generate three transmit beams, which are respectively marked as a beam 1, a beam 2, and a beam 3; the terminal device may generate two receive beams, which are respectively marked as a beam a and a beam b. In this case, the network device respectively sends a reference signal 1, a reference signal 2, and a reference signal 3 by using the beam 1, the beam 2, and the beam 3; the terminal device receives the reference signal 1, the reference signal 2, and the reference signal 3 by using the beam a, receives the reference signal 1, the reference signal 2, and the reference signal 3 by using the beam b, then determines, based on the received reference signals, beam pairs (to be specific, a beam pair including the beam 1 and the beam a, a beam pair including the beam 2 and the beam a, a beam pair including the beam 3 and the beam a, a beam pair including the beam 1 and the beam b, a beam pair including the beam 2 and the beam b, and a beam pair including the beam 3 and the beam b) for transmitting these reference signals, and determines a beam pair that satisfies the preset condition. Assuming that the beam pair determined to satisfy the preset condition is the beam pair including the beam 3 and the beam a, the terminal device may feed back, to the network device, information indicating the beam 3.

It should be understood that the uplink beam alignment means that the network device measures channel quality of a plurality of beams sent by the terminal device, selects a beam having good channel quality from the plurality of beams, and sends channel state information to the terminal device.

For example, a process of the uplink beam alignment may include: The terminal device sends one or more reference signals to the network device by using each transmit beam, where resource multiplexing (for example, time domain and/or frequency domain resource multiplexing is performed in a manner of time division, frequency division, code division, or a combination thereof) may be performed between reference signals sent by using different transmit beams; the network device receives, by using each of a plurality of receive beams, the reference signal sent by each transmit beam of the terminal device, then estimates, based on the plurality of received reference signals, channel quality from each transmit beam of the terminal device to each receive beam of the network device, and determines a beam pair whose channel quality satisfies a preset condition. Subsequently, the terminal device may send a control channel, a data channel, a sounding reference signal, or the like by using the transmit beam in the beam pair, and the network device may receive, by using a receive beam in the beam pair, the control channel, the data channel, the sounding reference signal, or the like that is sent by the terminal device.

In addition, when a transmit beam is a transmit beam of the network device, as shown in (e) in FIG. 1, the network device sends reference signals to the terminal device by using different transmit beams, and the terminal device receives, by using a same receive beam, the reference signals sent by the network device by using the different transmit beams, determines an optimal transmit beam of the network device based on the received signals, and then feeds back the optimal transmit beam of the network device to the network device, so that the network device updates the transmit beams. When a transmit beam is a transmit beam of the terminal device, as shown in (d) in FIG. 1, the terminal device sends reference signals to the network device by using different transmit beams, and the network device receives, by using a same receive beam, the reference signals sent by the terminal device by using the different transmit beams, determines an optimal transmit beam of the terminal device based on the received signals, and then feeds back the optimal transmit beam of the terminal device to the terminal device, so that the terminal device updates the transmit beams. A process of determining the optimal transmit beam based on the received signals may be referred to as beam matching.

When a receive beam is a receive beam of the network device, as shown in (0 in FIG. 1, the terminal device sends reference signals to the network device by using a same transmit beam, and the network device receives, by using different receive beams, the reference signals sent by the terminal device, and then determines an optimal receive beam of the network device based on the received signals, to update the receive beams of the network device. When a receive beam is a receive beam of the terminal device, as shown in (c) in FIG. 1, the network device sends reference signals to the terminal device by using a same transmit beam, and the terminal device receives, by using different receive beams, the reference signals sent by the network device, and then determines an optimal receive beam of the terminal device based on the received signals, to update the receive beams of the terminal device.

The beam is a communication resource. The beam may be a wide beam, a narrow beam, or another type of beam. A technology for forming a beam may be a beamforming technology or another technical means. The beamforming technology may be a digital beamforming technology, an analog beamforming technology, or a hybrid digital/analog beamforming technology. Different beams may be considered as different resources. Same information or different information may be sent by using different beams. Optionally, a plurality of beams having a same communication characteristic or similar communication characteristics may be considered as one beam. One beam may include one or more antenna ports, configured to transmit a data channel, a control channel, a sounding reference signal, and the like. For example, a transmit beam may be signal strength distribution formed in different directions in space after a signal is transmitted by an antenna, and a receive beam may be signal strength distribution in different directions in space of a radio signal received from an antenna. It may be understood that one or more antenna ports forming one beam may also be considered as one antenna port set.

Beams may be classified into a transmit beam and a receive beam of the network device and a transmit beam and a receive beam of the terminal device. The transmit beam of the network device is used to describe transmit-side beamforming information of the network device. The receive beam of the network device is used to describe receive-side beamforming information of the network device. The transmit beam of the terminal device is used to describe transmit-side beamforming information of the terminal device. The receive beam of the terminal device is used to describe receive-side beamforming information of the terminal device. The beam is used to describe beamforming information.

The beam may correspond to at least one of a time resource, a space resource, and a frequency domain resource. Optionally, the beam may alternatively correspond to a reference signal resource (for example, a reference signal resource for beamforming) or the beamforming information. Optionally, the beam may alternatively correspond to information associated with a reference signal resource of the network device. A reference signal may be a channel state information reference signal (Channel State Information-Reference Signal, CSI-RS), a synchronization signal/physical broadcast channel block (synchronization signal/PBCH block, SSB), a demodulation reference signal (demodulation reference signal, DMRS), a phase tracking signal (phase tracking reference signal, PTRS), a tracking signal (tracking reference signal, TRS), or the like. The information associated with the reference signal resource may be an index of the reference signal resource, QCL information (for example, QCL information of a type D), or the like. The index of the reference signal resource corresponds to a transmit-receive beam pair that is previously established during measurement performed based on the reference signal resource. The terminal device may infer beam information based on the index of the reference signal resource. Optionally, the beam may alternatively correspond to a spatial domain filter (spatial filter or spatial domain filter), a spatial domain transmission filter (spatial domain transmission filter), a spatial filter, or a spatial transmission filter. The receive beam is equivalent to the spatial transmission filter, the spatial domain transmission filter, a spatial domain receive filter, or a spatial receive filter. The transmit beam may be equivalent to the spatial domain filter, the spatial domain transmission filter, a spatial domain transmit filter, or a spatial transmit filter. Information about a spatial correlation parameter is equivalent to the spatial filter (spatial domain transmit/receive filter).

An SS/PBCH block may also be referred to as an SSB. The SSB includes at least one of a primary synchronization signal (primary synchronization signal, PSS), a secondary synchronization signal (secondary synchronization signal, SSS), and a PBCH. The SSB is a signal mainly used for cell searching, cell synchronization, and carrying broadcast information.

Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. Optionally, a receive beam on a terminal device side and a transmit beam on a network device side may be downlink spatial filters, and a transmit beam on the terminal device side and a receive beam on the network device side may be uplink spatial filters.

The quasi-colocation information may also be referred to as colocation assumption information. The QCL information is used to assist in describing the receive-side beamforming information and a receiving procedure of the terminal device. The QCL information is used to indicate a QCL relationship between a source reference signal and a target reference signal. The target reference signal may be usually a DMRS, a CSI-RS, or the like. The source reference signal may be usually a CSI-RS, a TRS, an SSB, or the like. It should be understood that spatial characteristic parameters of two reference signals or channels that satisfy the QCL relationship are the same. Therefore, a spatial characteristic parameter of the target reference signal can be inferred based on a resource index of the source reference signal.

The spatial characteristic parameter includes one or more of the following parameters: an angle of arrival (angle of arrival, AoA), a dominant (Dominant) angle of arrival, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay (average delay), a delay spread (delay spread), a Doppler spread (doppler spread), a Doppler shift (doppler shift), a spatial reception parameter (spatial Rx parameters), and the like.

The spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that the terminal device may receive the target reference signal based on information about a receive beam that is of the source reference signal and that is indicated by the QCL information.

To reduce overheads of indicating the QCL information by the network device side to the terminal device side, in an optional implementation, the network device side may indicate that a demodulation reference signal of a physical downlink control channel (Physical Downlink Control Channel, PDCCH) or a physical downlink shared channel (Physical Downlink Shared Channel, PDSCH) and one or more of a plurality of reference signal resources previously reported by the terminal device satisfy the QCL relationship. For example, the reference signal may be a CSI-RS. Herein, each reported CSI-RS resource index corresponds to a transmit-receive beam pair that is previously established during measurement performed based on a CSI-RS resource. It should be understood that, information about a receive beam of two reference signals or channels that satisfy the QCL relationship is the same. Therefore, the terminal device may infer, based on a resource index of the reference signal, information about a receive beam for receiving the PDCCH or the PDSCH.

Four types of QCL are defined in an existing standard, and the network device may simultaneously configure one or more types of QCL for the terminal device, for example:
  QCL type A: a Doppler shift, a Doppler spread, an average delay, and a delay spread;
  QCL type B: the Doppler shift and the Doppler spread;
  QCL type C: the average delay and the Doppler shift; and
  QCL type D: a spatial reception parameter.

It should be understood that, spatial characteristic parameters of two reference signals or channels that satisfy spatial correlation information are the same, so that the spatial characteristic parameter of the target reference signal can be inferred based on the resource index of the source reference signal.

These spatial characteristic parameters describe a characteristic of a spatial channel between an antenna port for the source reference signal and an antenna port for the target reference signal, and help the terminal device complete a transmit-side beamforming or a transmitting processing process based on the spatial correlation information. It should be understood that the terminal device may transmit the target reference signal based on information about a transmit beam that is of the source reference signal and that is indicated by the spatial correlation information.

A transmission configuration indicator (transmission configuration indicator, TCI) state (state) is used to indicate QCL information of a signal or a channel. The channel may be a PDCCH/CORESET or a PDSCH. The signal may be a CSI-RS, a DMRS, a TRS, a PTRS, or the like. TCI information indicates that a reference signal included in the TCI and the channel or the signal satisfy a QCL relationship, and is mainly used to indicate that during reception of the signal or the channel, information such as a spatial characteristic parameter of the signal or the channel is the same as, similar to, or approximate to information such as a spatial characteristic parameter of the reference signal included in the TCI.

One or more referenced reference signals and an associated QCL type (QCL type) may be configured for one TCI state (TCI state). QCL types may further be classified into four categories: A, B, C, and D that are different combinations or selections of {Doppler shift, Doppler spread, average delay, delay spread, spatial Rx parameter}. The TCI state includes QCL information, or the TCI state is used to indicate the QCL information.

To improve efficiency of blindly detecting a control channel by the terminal device, the concept of control resource set is proposed in an NR standard formulation process. The network device may configure one or more resource sets for the terminal device, to send a PDCCH. The network device may send the control channel to the terminal device on any control resource set corresponding to the terminal device. In addition, the network device further needs to notify the terminal device of another configuration, for example, a search space set, associated with the control resource set. Configuration information of the control resource sets is different. For example, there is a frequency domain width difference or a time domain length difference. It is extensible that the control resource set in this application may be a CORESET, a control region (control region), or an enhanced physical downlink control channel (enhanced physical downlink control channel, ePDCCH) set (set) that is defined in a 5G mobile communication system.

A time-frequency position occupied by the PDCCH may be referred to as a downlink control region. In long term evolution (Long Term Evolution, LTE), the PDCCH is always located on the first m (where m may be 1, 2, 3, or 4) symbols of a subframe. It should be noted that position of an E-PDCCH and an R-PDCCH in LTE are not on the first m symbols.

In NR, the downlink control region may be flexibly configured by using radio resource control (Radio Resource Control, RRC) signaling based on a control resource set and a search space set (search space set).

In the control resource set, information such as a frequency domain position of a PDCCH or a control channel element (control channel element, CCE) and a quantity of contiguous symbols in time domain may be configured.

In the search space set, information such as a PDCCH detection periodicity, a PDCCH offset, and a start symbol in a slot may be configured.

For example, if it may be configured in the search space set in such a manner that the PDCCH periodicity is one slot and the start symbol in time domain is a symbol 0, the terminal device may detect a PDCCH at a start position of each slot.

Through beam training, the network device may communicate with the terminal device by using a preferred beam. However, because of blocking in a communication process and a poor diffraction capability in a high frequency channel, a current serving beam is blocked, and signal transmission cannot proceed. In consideration of impact of an interference factor on a beam, to select a beam having better communication quality, the network device may configure, for the terminal device, an interference measurement resource (interference measurement resource, IMR) used for interference measurement, so that the terminal device measures interference of a corresponding beam, and selects a beam having better communication quality.

In addition, in the following descriptions, for a transmit side of the network device, a sent beam may be described as a reference signal resource. For example, a beam index 1 may be described as an index 1 of a reference signal resource. On a receive side of the terminal device, a received beam may be indicated by using the spatial reception parameter (Spatial Rx parameter) in QCL. The channel state information may be described as layer 1 (L1) reference signal received power (reference signal received power, RSRP) related information (related information).

In a communication system, different types of reference signals are usually used. A type of reference signal is used to estimate a channel, so that coherent demodulation can be performed on a received signal that includes control information or data. The other type is used for channel measurement state or channel quality, to schedule the terminal device. For example, the terminal device obtains channel state information based on measurement on channel quality of a CSI-RS. The channel state information may include at least one of a rank indicator (Rank Indicator, RI), a precoding indicator (Precoding Matrix Indicator, PMI), a channel quality indicator (Channel Quality Indicator, CQI), and the like.

The reference signal resource may be a time-frequency resource. The time-frequency resource includes a time domain resource and/or a frequency domain resource. An NR system supports various time scheduling units, and a length of the time scheduling unit may be one or more time-domain symbols. The symbol is an orthogonal frequency division multiplexing (orthogonal frequency division multiplexing, OFDM) symbol. The NR system includes slots (slots), and one slot includes 14 symbols. The NR system supports a plurality of subcarrier spacings. When subcarrier spacings are different, time lengths corresponding to the slot slot are different. For example, when a subcarrier spacing is 15 kilohertz (kilohertz, kHz), a time length corresponding to a slot is 1 millisecond (millisecond, ms). For example, when a subcarrier spacing is 30 kHz, a time length corresponding to a slot is 0.5 ms. For example, when a subcarrier spacing is 60 kHz, a time length corresponding to a slot is 0.25 ms. For example, when a subcarrier spacing is 120 kHz, a time length corresponding to a slot is 0.125 ms. Because a quantity of symbols in one slot is always 14, it may be understood that a time length corresponding to the symbol also varies with a subcarrier spacing. The frequency domain resource may be one or more resource blocks (resource blocks, RBs), may be one or more resource elements (resource elements, REs), may be one or more carriers/cells, may be one or more bandwidth parts (bandwidth parts, BWPs), may be one or more RBs in one or more BWPs on the one or more carriers, or may be one or more REs on the one or more RBs in the one or more BWPs on the one or more carriers. The time domain resource may be one or more slots, or may be one or more symbols in one or more slots.

In a conventional technology, if a reporting configuration (for example, a channel state information reporting configuration (Channel state information ReportConfig, CSI-ReportConfig)) configured by the network device indicates that a group-based beam reporting (groupBasedBeamReporting) parameter is configured to enabled (enabled), the network device indicates the terminal device to report information (for example, reference signal resource indexes and/or reference signal resource channel quality) of reference signals that can be received simultaneously. However, interference exists between two channel measurement resources that are received simultaneously. When configuring an interference measurement resource, the network device cannot learn of channel measurement resources that can be received simultaneously. Therefore, the terminal device cannot measure, based on the interference measurement resource that is configured by the network device and that is associated with a channel measurement resource, interference between the channel measurement resources that are received simultaneously, and interference information obtained through measurement is inaccurate.

It should be understood that simultaneous receiving refers to receiving at a same moment, receiving at an overlapping moment, receiving in a same time unit, or receiving in at least one overlapping time unit, and M reference signals overlap in at least one time unit. The time unit may be one or more radio frames, one or more subframes, one or more slots, one or more mini slots (mini slot), or one or more OFDM symbols defined in an LTE system or a 5G NR system, or may be a time window including a plurality of frames or subframes, for example, a system information (system information, SI) window. The following embodiment is described by using an example in which reference signals that are received simultaneously are reference signals received on one or more OFDM symbols. This is not limited in this application.

To resolve the foregoing problem, embodiments of this application provide a channel state information transmission method. The method includes: When a network device indicates that a reporting type is group-based reporting, channel state information reported by a terminal device to the network device includes indexes of X first reference signal resources and Y pieces of channel quality information, X is an integer greater than or equal to 2, and Y is an integer greater than or equal to 1, where for one of the X first reference signal resources (for example, a $j^{th}$ first reference signal resource), channel quality information of the $j^{th}$ first reference signal resource is determined based on the $j^{th}$ first reference signal resource and a second reference signal resource that has a first association relationship with the $j^{th}$ first reference signal resource; and the second reference signal resource that has the first association relationship with the $j^{th}$ first reference signal resource is determined based on a first reference signal resource other than the $j^{th}$ first reference signal resource in the X first reference signal resources. According to the channel state information transmission method provided in embodiments of this application, for a channel measurement resource that is received when interference exists, the terminal device measures interference on the channel measurement resource based on a reference signal resource associated with at least one other channel measurement resource that can be received simultaneously with the channel measurement resource, to obtain more accurate interference information.

The following describes implementations of embodiments of this application in detail with reference to the accompanying drawings.

Figure 3:
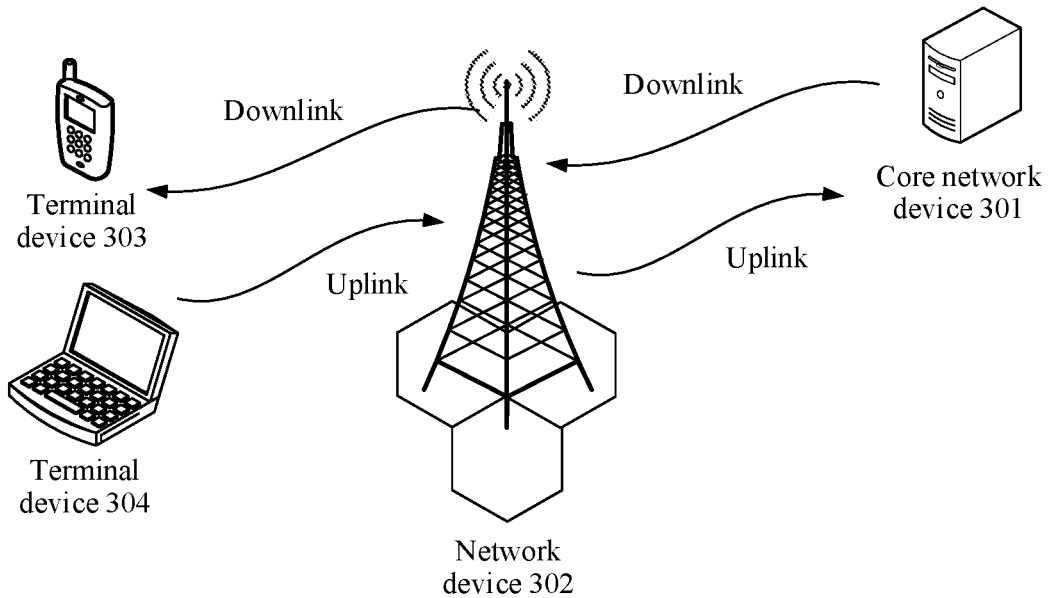
FIG. 3 is an example diagram of an architecture of a communication system according to an embodiment of this application.

FIG. 3 is an example diagram of an architecture of a communication system that may be used in an embodiment of this application. As shown in FIG. 3, the communication system includes a core network device 301, a network device 302, and at least one terminal device (for example, a terminal device 303 and a terminal device 304 shown in FIG. 3). The terminal device is connected to the network device in a wireless manner, and the network device is connected to the core network device in a wireless or wired manner. The core network device and the network device may be different physical devices independent of each other, or functions of the core network device and logical functions of the network device may be integrated into a same physical device, or a part of functions of the core network device and a part of functions of the network device may be integrated into one physical device. The terminal device may be located at a fixed position, or may be mobile. FIG. 3 is merely a schematic diagram. The communication system may further include other network devices. For example, the communication system may further include a wireless relay device and a wireless backhaul device, which are not drawn in FIG. 3. Quantities of core network devices, network devices, and terminal devices included in the communication system are not limited in embodiments of this application.

The terminal device may also be referred to as a terminal (Terminal), user equipment (user equipment, UE), a mobile station (mobile station, MS), a mobile terminal (mobile terminal, MT), or the like. The terminal device may be a mobile phone (mobile phone), a tablet (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote surgery (remote surgery), a wireless terminal in smart grid (smart grid), a wireless terminal in transportation safety (transportation safety), a wireless terminal in a smart city (smart city), a wireless terminal in a smart home (smart home), or the like. A specific technology and a specific device form used by the terminal device are not limited in embodiments of this application.

The network device is an entity used to transmit or receive a signal on a network side, for example, a generation NodeB (generation NodeB, gNodeB). The network device may be a device configured to communicate with a mobile device. The network device may be an AP in a wireless local area network (wireless local area network, WLAN), a base transceiver station (base transceiver station, BTS) in a global system for mobile communications (global system for mobile communications, GSM) or code division multiple access (code division multiple access, CDMA), or a NodeB (NodeB, NB) in wideband code division multiple access (wideband code division multiple access, WCDMA); or may be an evolved NodeB (evolved NodeB, eNB or eNodeB) in long term evolution (long term evolution, LTE), a relay station, an access point, a vehicle-mounted device, a wearable device, a network device in a future 5G network, a network device in a future evolved public land mobile network (public land mobile network, PLMN), a gNodeB in an NR system, a base station in a future mobile communication system, or an access node in a Wi-Fi system, or the like; or may be a module or unit that completes a part of functions of the base station, for example, may be a centralized unit (centralized unit, CU) or a distributed unit (distributed unit, DU). In addition, in embodiments of this application, the network device serves a cell, and the terminal device communicates with the network device by using a transmission resource (for example, a frequency domain resource, namely, a spectrum resource) used for the cell. The cell may be a cell corresponding to the network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have features of small coverage and low transmit power, and are applicable to providing a high-rate data transmission service. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as the network device.

Figure 4:
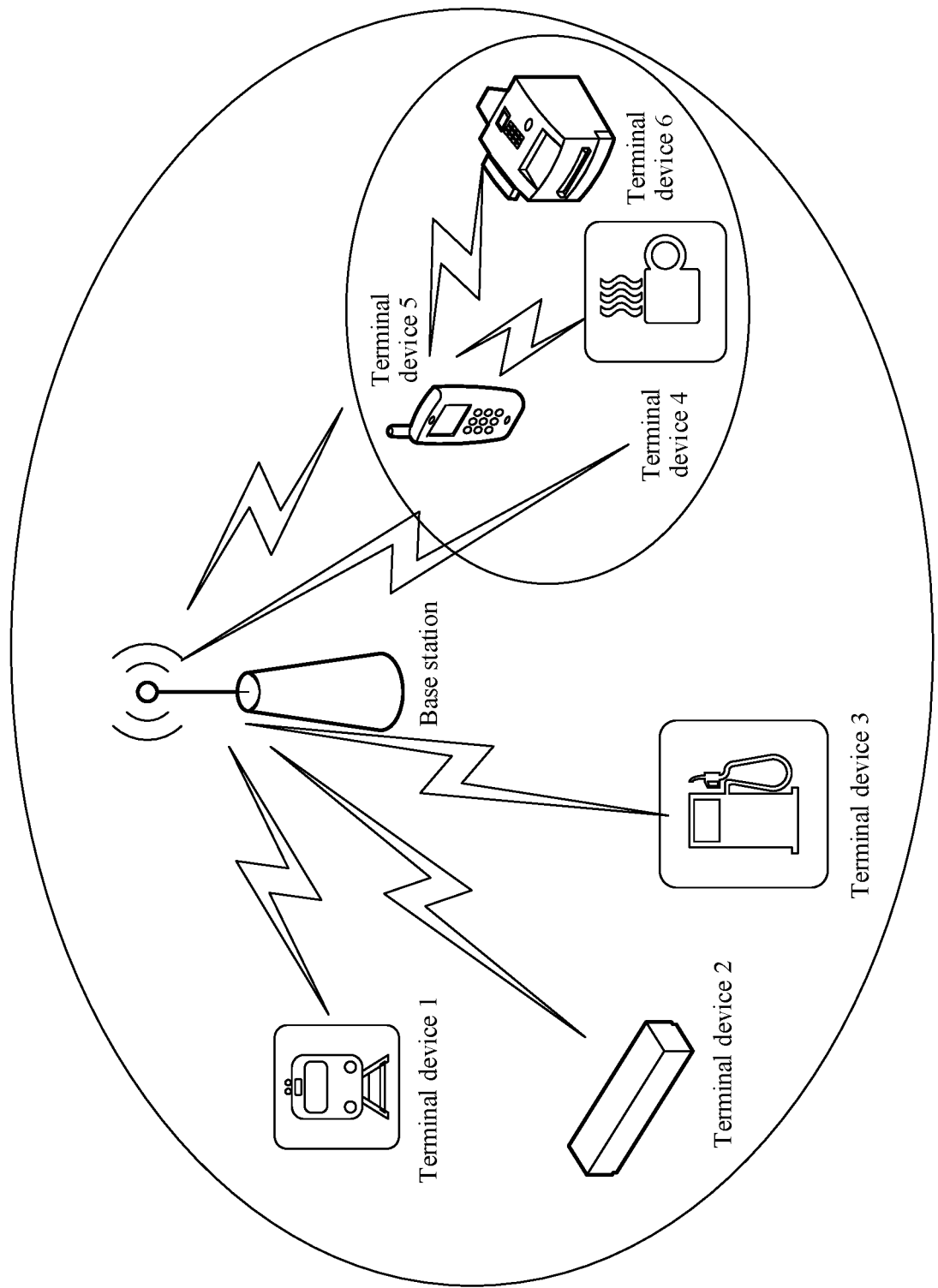
FIG. 4 is an example diagram of an architecture of another communication system according to an embodiment of this application.

The foregoing communication system may be a 5G NR system. Embodiments of this application may alternatively be applied to another communication system. Provided that an entity in the communication system needs to send transmission direction indication information, another entity needs to receive the indication information, and determines, based on the indication information, a transmission direction that is within a time period. For example, FIG. 4 is an example diagram of an architecture of another communication system according to an embodiment of this application. As shown in FIG. 4, the communication system includes a base station and a terminal device 1 to a terminal device 6. In the communication system, the terminal device 1 to the terminal device 6 may send uplink data to the base station, and the base station receives the uplink data sent by the terminal device 1 to the terminal device 6. Alternatively, the base station may send downlink data to the terminal device 1 to the terminal device 6, and the terminal device 1 to the terminal device 6 receive the downlink data. In addition, the terminal device 4 to the terminal device 6 may also constitute a communication system. In the communication system, the terminal device 5 may receive uplink information sent by the terminal device 4 or the terminal device 6, and the terminal device 5 sends downlink information to the terminal device 4 or the terminal device 6.

The network device and the terminal device may be deployed on land, and includes an indoor or outdoor device, a handheld device, or a vehicle-mounted device; may be deployed on water; or may be deployed on an airplane, a balloon, and a satellite in the air. Application scenarios of the network device and the terminal device are not limited in embodiments of this application.

Communication between the network device and the terminal device and communication between terminal devices may be performed by using a licensed spectrum (licensed spectrum), an unlicensed spectrum (unlicensed spectrum), or both the licensed spectrum and the unlicensed spectrum. A spectrum resource used between the network device and the terminal device is not limited in embodiments of this application.

Embodiments of this application are applicable to a case in which a terminal device measures quality of a downlink channel and feeds back channel quality information of the downlink channel to a network device, or applicable to device-to-device (device-to-device, D2D) signal transmission, or applicable to transmission in a V2X scenario. For the D2D signal transmission, a sending device is a terminal device, and a corresponding receiving device is also a terminal device.

In embodiments of this application, a time-domain symbol may be an orthogonal frequency division multiplexing (orthogonal frequency division multiplexing, OFDM) symbol, or may be a single-carrier frequency division multiplexing (single carrier-frequency division multiplexing, SC-FDM) symbol. Unless otherwise specified, symbols in embodiments of this application are all time-domain symbols.

It should be understood that the channel quality information in embodiments of this application may be channel quality information such as a signal to interference plus noise ratio (signal to interference plus noise ratio, SINR), a signal-to-noise ratio (signal-noise ratio, SNR), a channel quality indicator (channel quality indicator, CQI), or reference signal received quality (Reference signal received quality, RSRQ). The index of the first reference signal resource in embodiments of this application may be an NZP CSI-RS resource index (CSI-RS Resource Indicator, CRI) or an SSB resource index (SSB Resource Indicator, SSBRI).

It should be understood that, in embodiments of this application, the index of the first reference signal resource may be a relative index of a first reference signal resource in M first reference signal resources configured by the network device, or may be an absolute index of a first reference signal resource in a same type of reference signal resources configured by the network device, or may be a relative index or an absolute index in another range.

It should be understood that the "index" in embodiments of this application may be replaced with an "identifier".

It may be understood that in embodiments of this application, a PDSCH, a PDCCH, and a PUSCH are only used as examples of a downlink data channel, a downlink control channel, and an uplink data channel. In different systems and different scenarios, a data channel and a control channel may have different names. This is not limited in embodiments of this application.

Figure 5:
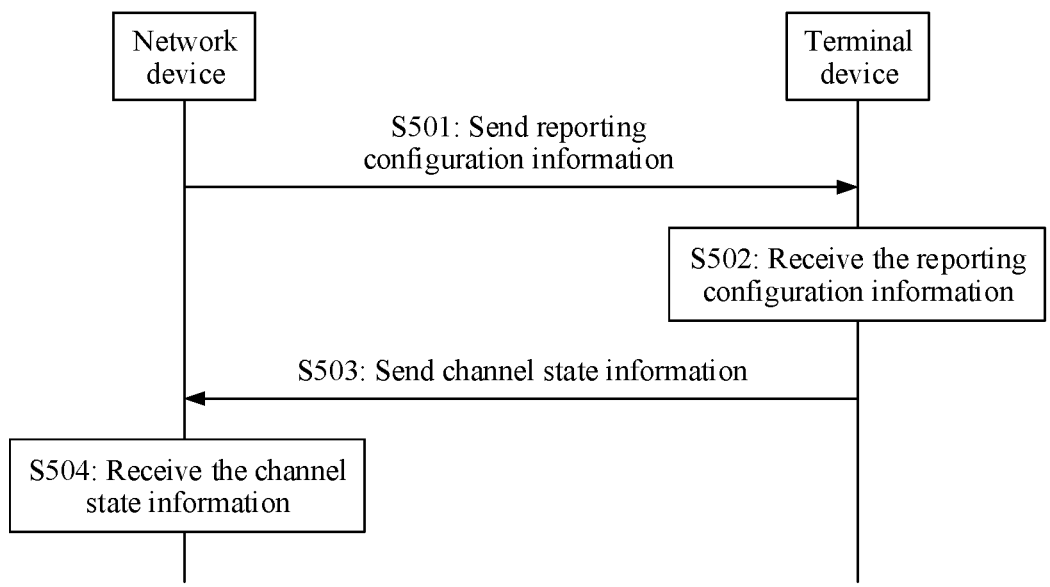
FIG. 5 is a flowchart of a channel state information transmission method according to an embodiment of this application.

Downlink signal transmission is used as an example below to describe in detail the channel state information transmission method provided in embodiments of this application. FIG. 5 is a flowchart of a channel state information transmission method according to an embodiment of this application. As shown in FIG. 5, the method may include the following steps.

S501: A network device sends reporting configuration information to a terminal device.

The reporting configuration information is used to indicate a reporting type. The reporting type is used to indicate group-based reporting.

In some embodiments, the network device may configure the reporting configuration information by using a CSI-ReportConfig parameter. The CSI-ReportConfig parameter includes a channel measurement resource field, an interference measurement resource field (for example, a CSI-IM resource and an NZP CSI-RS resource), and a group-based beam reporting (groupBasedBeamReporting) field.

Values of the group-based beam reporting field includes enabled (enabled) and disabled (disabled). If the value of the group-based beam reporting field is enabled, it indicates that the reporting type is the group-based reporting. If the value of the group-based beam reporting field is disabled, it indicates that the reporting type is not the group-based reporting.

It should be understood that the group reporting may be indicated by using the groupBasedBeamReporting field in the CSI-ReportConfig parameter.

In other words, the reporting type is used to indicate that the group-based beam reporting (groupBasedBeamReporting) parameter is configured to enabled (enabled).

In other words, the reporting type is used to indicate to report information of reference signals that are received simultaneously.

In other words, the reporting type is used to indicate to report channel state information of reference signals that are received simultaneously.

It should be understood that the group-based reporting may alternatively be indicated in another manner. This is not limited in embodiments of this application. The reporting configuration information may alternatively be used for indication in another manner. This is not limited in embodiments of this application.

The reporting configuration information may alternatively be used to indicate a first reference signal resource set and L second reference signal resource sets.

It should be understood that the reporting configuration information may directly indicate the first reference signal resource set and a second reference signal resource set; or the reporting configuration information may indicate a resource configuration, and the resource configuration indicates the first reference signal resource set and a second reference signal resource set. Optionally, the first reference signal resource set and L second reference signal resource sets may belong to a same resource configuration. Alternatively, the first reference signal resource set and the L second reference signal resource sets may belong to different resource configurations. For example, a first resource configuration is used to indicate the first reference signal resource set, and a second resource configuration is used to indicate the L second reference signal resource sets. This is not limited in embodiments of this application.

The resource configuration may be sent by using at least one of higher layer signaling, layer 2 signaling, or layer 1 signaling. For example, the higher layer signaling may be radio resource control (Radio Resource Control, RRC) signaling, the layer 2 signaling may be media access control control element (media access control control element, MAC CE) signaling, and the layer 1 signaling may be downlink control information (Downlink Control Information, DCI) signaling.

Similarly, the reporting configuration information may be sent by using at least one of higher layer signaling, layer 2 signaling, or layer 1 signaling. For example, the higher layer signaling may be RRC signaling, the layer 2 signaling may be MAC CE signaling, and the layer 1 signaling may be DCI signaling.

The first reference signal resource set may include M first reference signal resources, and M is an integer greater than 1. The first reference signal resource is used for channel measurement. The first reference signal resource may be referred to as a channel measurement resource. It may be understood that a first reference signal carried on each of the M first reference signal resources is used for channel measurement. The first reference signal may be an NZP CSI-RS or an SSB. The first reference signal resource may be an NZP CSI-RS resource or an SSB resource.

The resource configuration may be further used to indicate a type of the first reference signal resource set. The type of the first reference signal resource set includes a first type and a second type. The first type is used to indicate that the M first reference signals use different downlink spatial transmission filters (spatial transmission filters). "The M first reference signals use different downlink spatial transmission filters" may mean that the terminal device does not assume that a same spatial filter is used. To be specific, at least two reference signals use different spatial transmission filters. The network device may configure a repetition (repetition) field of the first reference signal resource set to "off" by using higher layer signaling (for example, RRC signaling), to indicate that the type of the first reference signal resource set is the first type. The first reference signal resource set of the first type may be an NZP CSI-RS resource set. The first reference signal resource set of the first type may be used by the terminal device to train a transmit beam on a network device side. The second type is used to indicate that the M first reference signals use a same downlink spatial transmission filter. The network device may configure the repetition (repetition) field of the first reference signal resource set to "on" by using higher layer signaling (for example, RRC signaling), to indicate that the type of the first reference signal resource set is the second type. The first reference signal resource set of the second type may be used by the terminal device to train a receive beam on a terminal device side.

It should be noted that the type of the first reference signal resource set may be configured by the network device, or may be determined by the terminal device based on the resource configuration. The first type may also be used to indicate that the M first reference signal resources use the different downlink spatial transmission filters. The second type may also be used to indicate that the M first reference signal resources use the same downlink spatial transmission filter.

A value range of L may be an integer greater than or equal to 1. For different values of L, the resource configuration may indicate one second reference signal resource set or at least two second reference signal resource sets. For example, when L=1, the resource configuration may indicate one second reference signal resource set. When L=2, the resource configuration may indicate two second reference signal resource sets. When L=3, the resource configuration may indicate three second reference signal resource sets. A quantity of second reference signal resources included in each of the L second reference signal resource sets may be the same or may be different. An $i^{th}$ second reference signal resource set may include $N_i$ second reference signal resources, where $N_i$ is an integer greater than or equal to 1, and i is an integer greater than or equal to 1 and less than or equal to L. For example, when L=2, the $1^{st}$ second reference signal resource set may include two second reference signal resources, and the $2^{nd}$ second reference signal resource set may also include two second reference signal resources. Alternatively, the $1^{st}$ second reference signal resource set may include 16 second reference signal resources, and the $2^{nd}$ second reference signal resource set may include four second reference signal resources. This is not limited in embodiments of this application.

A second association relationship exists between each first reference signal resource included in the first reference signal resource set and a part of second reference signal resources included in the L second reference signal resource sets. Alternatively, a second association relationship exists between each first reference signal resource and all second reference signal resources included in the L second reference signal resource sets.

In other words, the second association relationship exists between a $k^{th}$ first reference signal resource in the M first reference signal resources and at least one second reference signal resource in the L second reference signal resource sets, where k is an integer greater than or equal to 1 and less than or equal to M.

In embodiments of this application, a quantity indicated by L is not limited, and L may be any value. A quantity of second reference signal resources included in the L second reference signal resource sets may be not equal to M, that is, $L*N_i$ is not equal to M. Optionally, M may alternatively be not equal to $N_i$. It may also be understood as that a quantity of CMRs is greater than 1, and the quantity of CMRs may be not equal to a quantity of IMRs. Alternatively, the quantity of CMRs may be equal to the quantity of IMRs. This is not limited in embodiments of this application. In addition, the part of second reference signal resources are not all the second reference signal resources included in the L second reference signal resource sets.

The second association relationship between the first reference signal resource and the second reference signal resource is described below by using an example. It is assumed that the network device configures the M first reference signal resources and N second reference signal resources. N represents a quantity of second reference signal resources included in the L second reference signal resource sets.

In this specification, indexes of the M first reference signal resources and indexes of the N second reference signal resources may be sequentially numbered or not sequentially numbered. This is not limited.

In a first possible implementation, the N second reference signal resources may be grouped into M groups. The second association relationship exists between the $k^{th}$ first reference signal resource and a $k^{th}$ second reference signal resource group, where k is an integer greater than or equal to 1 and less than or equal to M.

Figure 6:
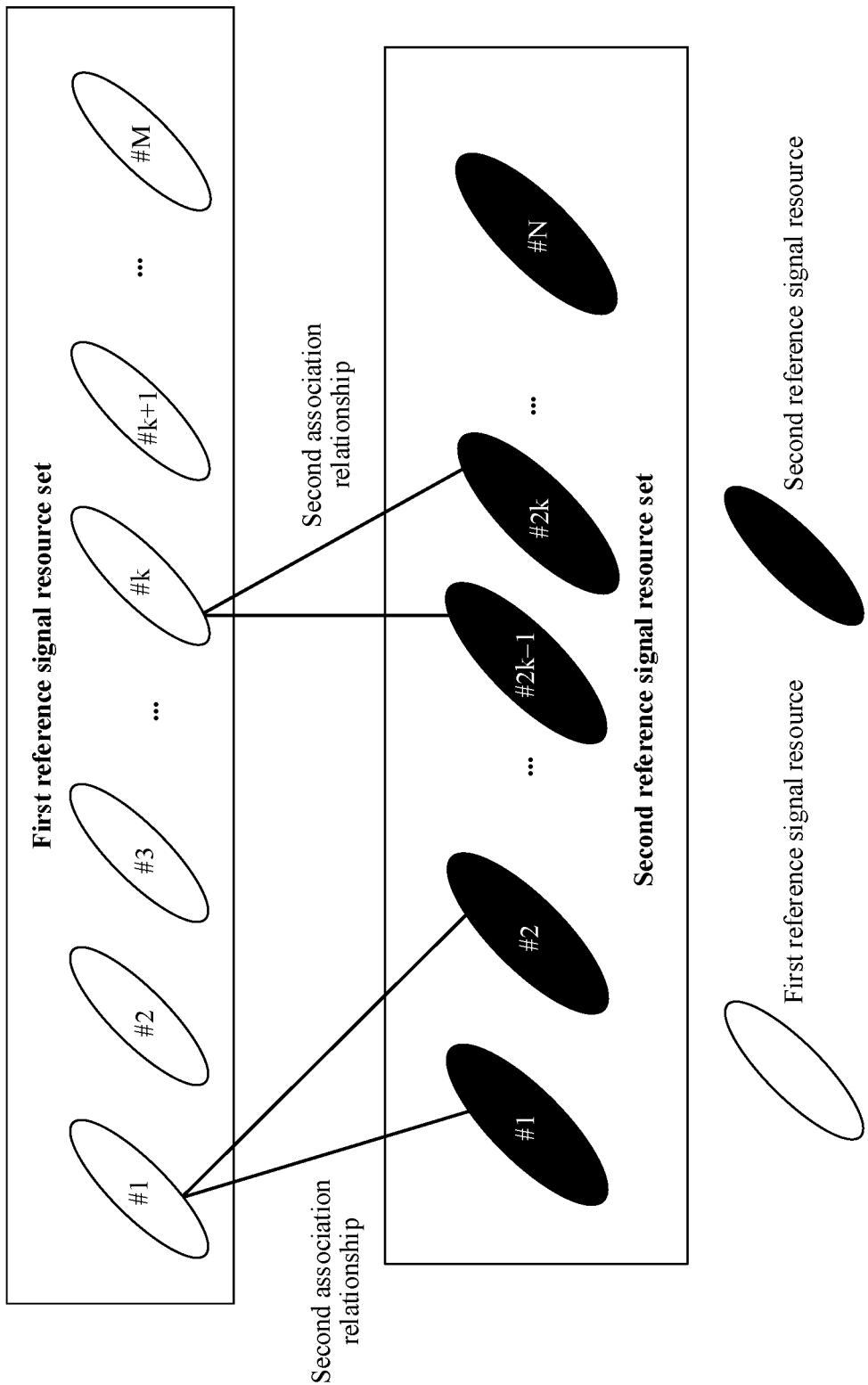
FIG. 6 is an example diagram of a second association relationship between resources according to an embodiment of this application.

For example, as shown in FIG. 6, for convenience, #n is used to represent an $n^{th}$ first reference signal resource in the M first reference signal resources, and #y is used to represent a $y^{th}$ second reference signal resource in the N second reference signal resources. Optionally, the $1^{st}$ second reference signal resource group includes a second reference signal resource #1 and a second reference signal resource #2. The second reference signal resource #1 and the second reference signal resource #2 have the second association relationship with the $1^{st}$ first reference signal resource #1. A $k^{th}$ second reference signal resource group includes a second reference signal resource #2k-1 and a second reference signal resource #2k. The second reference signal resource #2k-1 and the second reference signal resource #2k have the second association relationship with a $k^{th}$ first reference signal resource #k.

In some embodiments, if the N second reference signal resources are second reference signal resources in M second reference signal resource sets (for example, L=M), a $w^{th}$ second reference signal resource set is a $w^{th}$ second reference signal resource group, so that the second association relationship exists between a $w^{th}$ first reference signal resource and the $w^{th}$ second reference signal resource set, where w is an integer greater than or equal to 1 and less than or equal to M.

Figure 7:
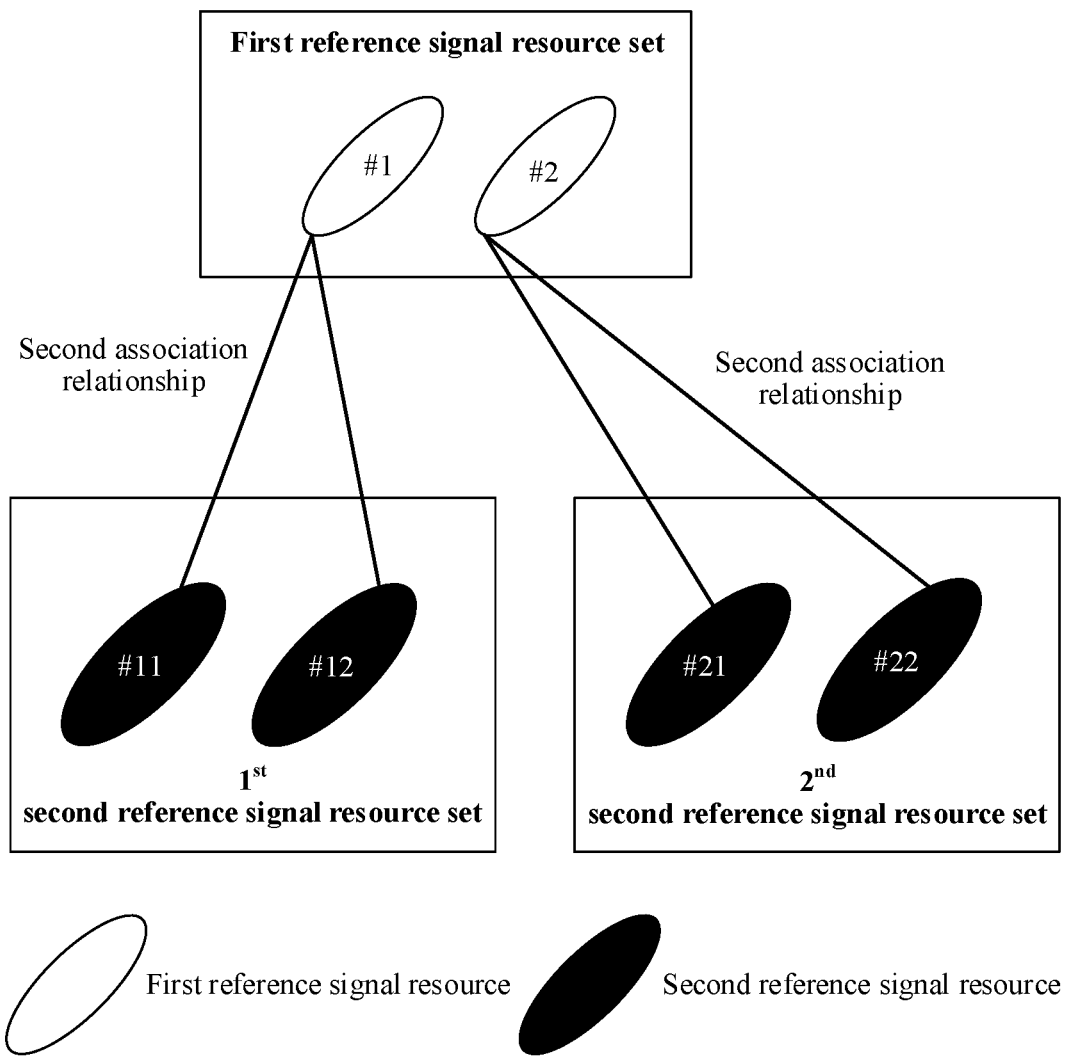
FIG. 7 is an example diagram of another second association relationship between resources according to an embodiment of this application.

For example, as shown in FIG. 7, for convenience, #n is used to represent an $n^{th}$ first reference signal resource in the M first reference signal resources, and #xy is used to represent a $y^{th}$ second reference signal resource in an $x^{th}$ second reference signal resource set. It is assumed that the first reference signal resource set includes two first reference signal resources, namely, a first reference signal resource #1 and a first reference signal resource #2. If L=2, the $1^{st}$ second reference signal resource set includes two second reference signal resources, namely, a second reference signal resource #11 and a second reference signal resource #12, and the $2^{nd}$ second reference signal resource set includes two second reference signal resources, namely, a second reference signal resource #21 and a second reference signal resource #22. The first reference signal resource #1 has the second association relationship with each of the second reference signal resource #11 and the second reference signal resource #12. The first reference signal resource #2 has the second association relationship with each of the second reference signal resource #21 and the second reference signal resource #22.

In some other embodiments, the N second reference signal resources are second reference signal resources in one second reference signal resource set, and the N second reference signal resources may be grouped into M groups.

Specifically, the N second reference signal resources may be equally grouped into the M groups based on a sequence of the second reference signal resources indicated in the second reference signal resource set, for example, as shown in FIG. 6.

Alternatively, the N second reference signal resources are equally grouped into the M groups in ascending order of indexes of the N second reference signal resources.

Alternatively, the N second reference signal resources are equally grouped into the M groups in descending order of indexes of the N second reference signal resources.

A quantity of first reference signal resources may be equal to a quantity of second reference signal resource groups. The second association relationship may exist between a $w^{th}$ first reference signal resource and a $w^{th}$ second reference signal resource group.

In a second possible implementation, the M first reference signal resources are grouped into N groups in total. The second association relationship exists between an $i^{th}$ first reference signal resource group and an $i^{th}$ second reference signal resource, where i is an integer greater than or equal to 1 and less than or equal to N. It may be understood that the second association relationship exists between at least one first reference signal resource and one second reference signal resource.

Figure 8:
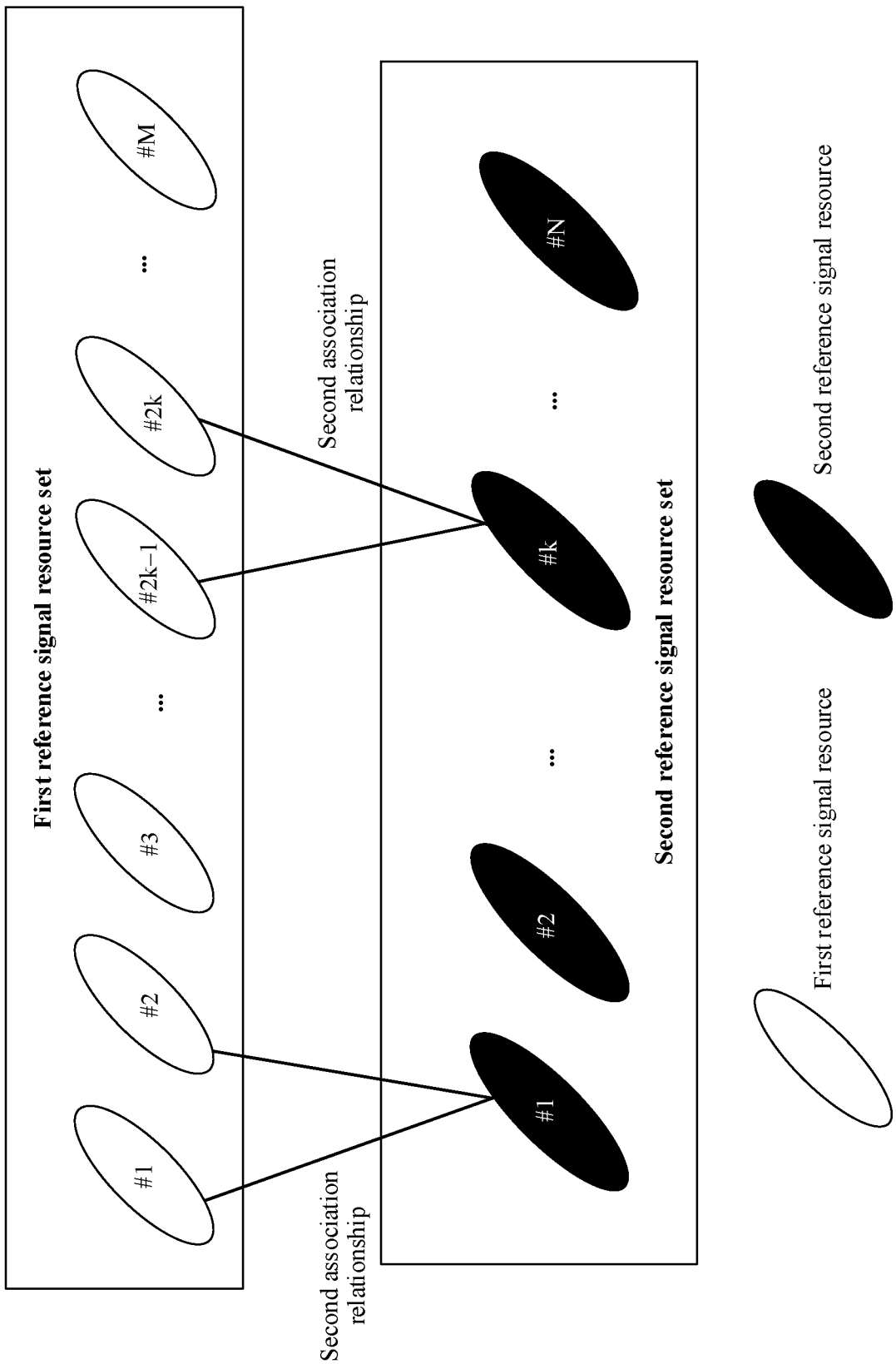
FIG. 8 is an example diagram of still another second association relationship between resources according to an embodiment of this application.

For example, as shown in FIG. 8, the $1^{st}$ first reference signal resource group includes a first reference signal resource #1 and a first reference signal resource #2. The first reference signal resource #1 and the first reference signal resource #2 have the second association relationship with the $1^{st}$ second reference signal resource #1. A $k^{th}$ first reference signal resource group includes a first reference signal resource #2k-1 and a first reference signal resource #2k. The first reference signal resource #2k-1 and the first reference signal resource #2k have the second association relationship with a $k^{th}$ second reference signal resource #k.

In some embodiments, if the M first reference signal resources are reference signal resources in one reference signal resource set, the M first reference signal resources may be grouped into N groups.

Specifically, the M first reference signal resources may be equally grouped into the N groups based on a sequence of the first reference signal resources indicated in the first reference signal resource set.

Alternatively, the M first reference signal resources are equally grouped into the N groups in ascending order of indexes of the M first reference signal resources.

Alternatively, the M first reference signal resources are equally grouped into the N groups in descending order of indexes of the M first reference signal resources.

A quantity of first reference signal resource groups may be equal to a quantity of second reference signal resources. The second association relationship may exist between a $w^{th}$ first reference signal resource group and a $w^{th}$ second reference signal resource.

In some other embodiments, if the M first reference signal resources are first reference signal resources in N first reference signal resource sets, a $w^{th}$ first reference signal resource set is a $w^{th}$ first reference signal resource group, so that the second association relationship exists between the $w^{th}$ first reference signal resource set and a $w^{th}$ second reference signal resource, where w is an integer greater than or equal to 1 and less than or equal to N.

In a third possible implementation, the M first reference signal resources are grouped into P groups in total, the N second reference signal resources are grouped into P groups in total, and the second association relationship exists between a $w^{th}$ first reference signal resource group and a $w^{th}$ second reference signal resource group, where w is an integer greater than or equal to 1 and less than or equal to P, and P is an integer greater than or equal to 1.

Figure 9:
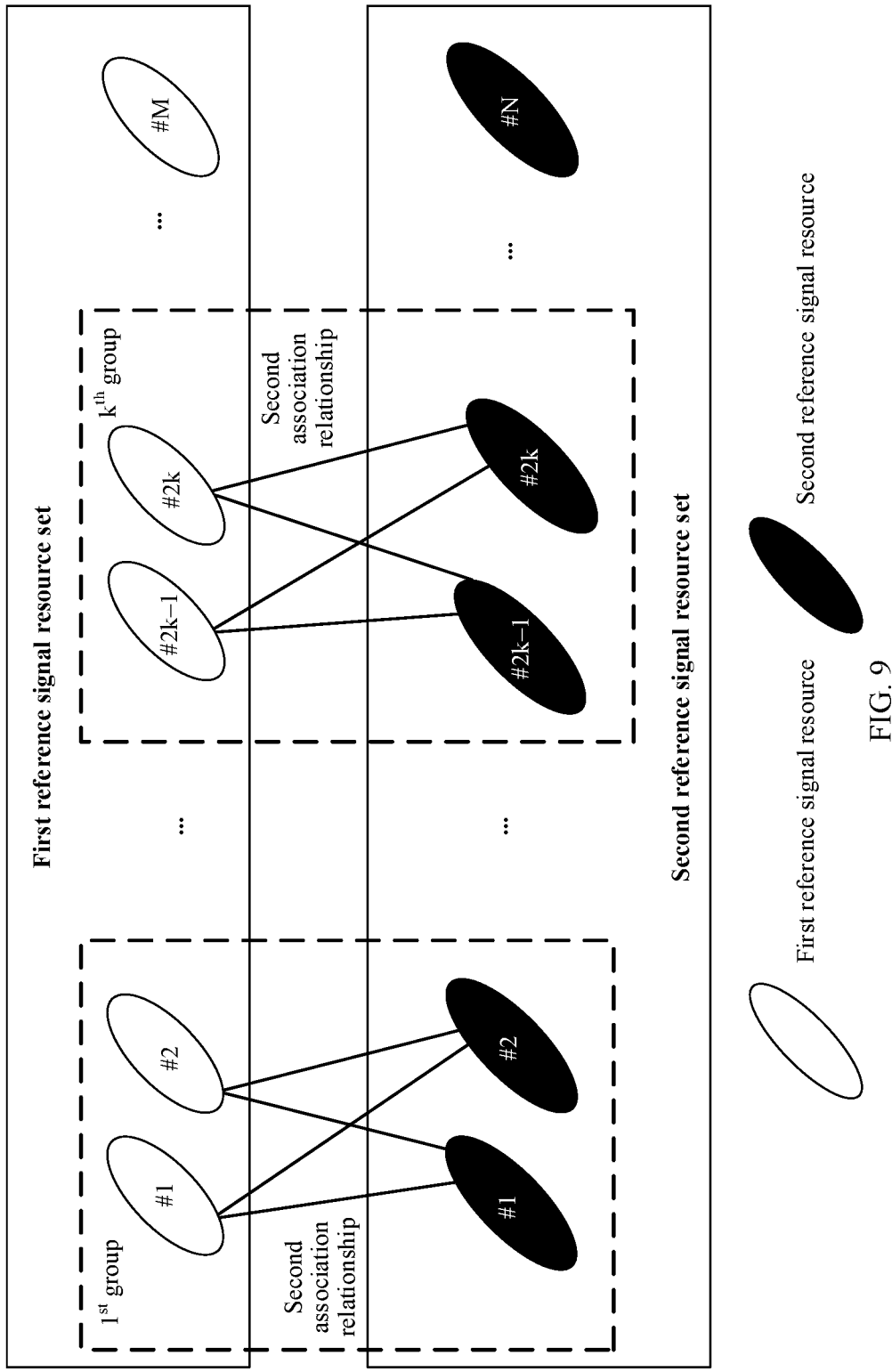
FIG. 9 is an example diagram of yet another second association relationship between resources according to an embodiment of this application.

For example, as shown in FIG. 9, the $1^{st}$ first reference signal resource group includes a first reference signal resource #1 and a first reference signal resource #2. The $1^{st}$ second reference signal resource group includes a second reference signal resource #1 and a second reference signal resource #2. The second association relationship exists between the $1^{st}$ reference signal resource group and the $1^{st}$ second reference signal resource group. A $k^{th}$ first reference signal resource group includes a first reference signal resource #2$k$-1 and a first reference signal resource #2$k$. A $k^{th}$ second reference signal resource group includes a second reference signal resource #2$k$-1 and a second reference signal resource #2$k$. The second association relationship exists between the $k^{th}$ reference signal resource group and the $k^{th}$ second reference signal resource group.

In some embodiments, if the M first reference signal resources are first reference signal resources in one first reference signal resource set, the M first reference signal resources may be grouped into P groups.

Specifically, the M first reference signal resources may be equally grouped into the P groups based on a sequence of the reference signal resources indicated in the first reference signal resource set.

Alternatively, the M first reference signal resources are equally grouped into the P groups in ascending order of indexes of the M first reference signal resources.

Alternatively, the M first reference signal resources are equally grouped into the P groups in descending order of indexes of the M first reference signal resources.

In some other embodiments, if the M first reference signal resources are first reference signal resources in P first reference signal resource sets, a $w^{th}$ first reference signal resource set is a $w^{th}$ first reference signal resource group, so that the second association relationship exists between the $w^{th}$ first reference signal resource set and a $w^{th}$ second reference signal resource group, where w is an integer greater than or equal to 1 and less than or equal to P.

In some embodiments, if the N second reference signal resources are second reference signal resources in one second reference signal resource set, the N second reference signal resources may be grouped into P groups.

Specifically, the N second reference signal resources may be equally grouped into the P groups based on a sequence of the second reference signal resources indicated in the second reference signal resource set.

Alternatively, the N second reference signal resources are equally grouped into the P groups in ascending order of indexes of the N second reference signal resources.

Alternatively, the N second reference signal resources are equally grouped into the P groups in descending order of indexes of the N second reference signal resources.

A quantity of first reference signal resource groups may be equal to a quantity of second reference signal resource groups. The second association relationship may exist between a $w^{th}$ first reference signal resource group and a $w^{th}$ second reference signal resource group, where w is an integer greater than or equal to 1 and less than or equal to P.

In some other embodiments, if the N second reference signal resources are second reference signal resources in P second reference signal resource sets (for example, L=P), a $w^{th}$ second reference signal resource set is a $w^{th}$ second reference signal resource group, so that the second association relationship exists between a $w^{th}$ first reference signal resource group and the $w^{th}$ second reference signal resource set, where w is an integer greater than or equal to 1 and less than or equal to P.

It should be noted that, in this embodiment of this application, the second association relationship between the first reference signal resource and the second reference signal resource may be configured by the network device, or may be predefined in a protocol, or may be reported by the terminal device. It should be understood that the foregoing content merely describes the second association relationship between the first reference signal resource and the second reference signal resource by using an example. The second association relationship may alternatively be implemented in another manner. This is not limited in embodiments of this application.

In some embodiments, the second reference signal resource is used for interference measurement. The second reference signal resource may be referred to as an interference measurement resource (interference measurement resource, IMR). A second reference signal carried on the second reference signal resource is used for interference measurement. The second reference signal may be an NZP CSI-RS or CSI-IM. The CSI-IM may alternatively be replaced with a ZP CSI-RS. The second reference signal resource may be an NZP CSI-RS resource or a CSI-IM resource.

In some other embodiments, the second reference signal resource that has the second association relationship with the $k^{th}$ first reference signal resource is a zero-power second reference signal resource, and positions of the $k^{th}$ first reference signal resource and the second reference signal resource that has the second association relationship with the $k^{th}$ first reference signal resource partially or completely overlap. The zero-power second reference signal resource may be a CSI-IM resource or a ZP CSI-RS resource. The ZP CSI-RS may mean that, information is sent, at a zero power, on a resource corresponding to the ZP CSI-RS; or no information is sent, at the zero power, on the resource corresponding to the ZP CSI-RS.

In some other embodiments, the second reference signal resource that has the second association relationship with the $k^{th}$ first reference signal resource is a non-zero-power second reference signal resource, and the $k^{th}$ first reference signal resource and the second reference signal resource that has the second association relationship with the $k^{th}$ first reference signal resource use a same downlink spatial transmission filter. The non-zero-power second reference signal resource may be an NZP CSI-RS resource.

The second reference signal resource that has the second association relationship with the $k^{th}$ first reference signal resource may be used to simulate power information on the $k^{th}$ first reference signal resource. In other words, the second reference signal resource that has the second association relationship with the $k^{th}$ first reference signal resource may be used to measure the power information on the $k^{th}$ first reference signal resource.

According to the foregoing rule, the second association relationship may exist between each first reference signal resource included in the first reference signal resource set and at least one second reference signal resource included in the second reference signal resource set. In addition, the second reference signal resources that are in the second reference signal resource set and that correspond to all the first reference signal resources in the first reference signal resource set may be the same or may be different. Alternatively, the second association relationship may exist between a part of the first reference signal resources in the first reference signal resource set and a part of the second reference signal resources in the second reference signal resource set. For example, the second association relationship may exist between two first reference signal resources in the first reference signal resource set and two second reference signal resources in the second reference signal resource set. Alternatively, the second association relationship may exist between all the first reference signal resources in the first reference signal resource set and a part of the second reference signal resources in the second reference signal resource set. Alternatively, the second association relationship may exist between all the first reference signal resources in the first reference signal resource set and all the second reference signal resources in the second reference signal resource set.

In addition, the resource configuration may include an index of the first reference signal resource set, indexes of the L second reference signal resource sets, and type information of the first reference signal resource set, to indicate the first reference signal resource set, the L second reference signal resource sets, and the type of the first reference signal resource set. A specific indication manner may alternatively be another manner. This is not limited in embodiments of this application.

Optionally, the resource configuration may alternatively be used to indicate the second association relationship between the first reference signal resource in the first reference signal resource set and the second reference signal resource in the second reference signal resource set. The second association relationship may exist between a plurality of first reference signal resources and a same second reference signal resource, or the second association relationship may exist between a plurality of first reference signal resources and a plurality of same second reference signal resources. Alternatively, a plurality of channel measurement resources may share one interference measurement resource set. The terminal device may select an interference measurement resource from the interference measurement resource set for each channel measurement resource, to calculate an L1-SINR. Alternatively, the second association relationship exists between a plurality of first reference signal resources and a plurality of different second reference signal resources.

The resource configuration may alternatively be used to configure at least two first reference signal resource sets. Each first reference signal resource set is used for channel measurement. A first reference signal resource in each first reference signal resource set may correspond to the second reference signal resource in the L second reference signal resource sets. For a specific correspondence, refer to the foregoing descriptions. Details are not described herein in this application.

S502: The terminal device receives the resource reporting configuration information sent by the network device.

The reporting configuration information is used to indicate the reporting type. The reporting type is used to indicate the group-based reporting. For detailed explanations of the group-based reporting, refer to the descriptions of S501. Details are not described again.

S503: The terminal device sends channel state information to the network device.

The terminal device receives the reporting configuration information, and may determine the first reference signal resource set, the L second reference signal resource sets, and the reporting type based on the reporting configuration information.

The first reference signal resource set may include the M first reference signal resources, and M is an integer greater than 1. The first reference signal resource is used for channel measurement. The second reference signal resource set includes the N second reference signal resources. The second reference signal resource is used for interference measurement, and L is an integer greater than or equal to 1.

After receiving the reporting configuration information, the terminal device may measure a first reference signal on the first reference signal resource to obtain a receive power or a signal power of the first reference signal, and measure a second reference signal on the second reference signal resource to obtain a receive power or a signal power of the second reference signal.

The reporting type is the group-based reporting. The terminal device may report channel state information of a plurality of reference signal resources to the network device in a form of a group. In some embodiments, the terminal device reports, to the network device, channel state information of reference signal resources that are received simultaneously. Optionally, the channel state information of the reference signal resource may alternatively be replaced with the channel state information of the reference signal.

The channel state information includes indexes of X first reference signal resources and Y pieces of channel quality information, where X is an integer greater than or equal to 2, and Y is an integer greater than or equal to 1.

In some embodiments, the X first reference signal resources are received simultaneously. In other words, the X first reference signal resources may be grouped into one reference signal resource group, and all reference signal resources, some reference signal resources, or any two reference signal resources in the reference signal resource group may be received simultaneously.

In some other embodiments, the X first reference signal resources may be grouped into at least two reference signal resource groups, and reference signal resources included in each group may be received simultaneously.

It should be understood that, in a possible implementation, Y may be equal to 1, and the Y pieces of channel quality information may be channel quality information of one of the X first reference signal resources. For example, the Y pieces of channel quality information may be channel quality information of the Pt first reference signal resource in the X first reference signal resources (or a reference signal resource indicated by the $1^{st}$ first reference signal resource index in the channel state information reported by the terminal device). In another possible implementation, Y may be equal to X, and the Y pieces of channel quality information may be channel quality information of the X first reference signal resources. For example, an $i^{th}$ piece of channel quality information in the channel state information reported by the terminal device may be a reference signal resource indicated by an $i^{th}$ first reference signal resource index in the channel state information reported by the terminal device. In another possible implementation, Y may be less than X, and the Y pieces of channel quality information may be channel quality information of some of the X first reference signal resources.

In some possible implementations, the terminal device may determine, based on quality of a reference signal measured by the terminal device, the X first reference signal resource received simultaneously.

A sequence of determining the X first reference signal resources that are received simultaneously and measuring the channel quality of the X first reference signal resources that are received simultaneously is not limited in this application. They may be a same step, or may be two steps.

Figure 10:
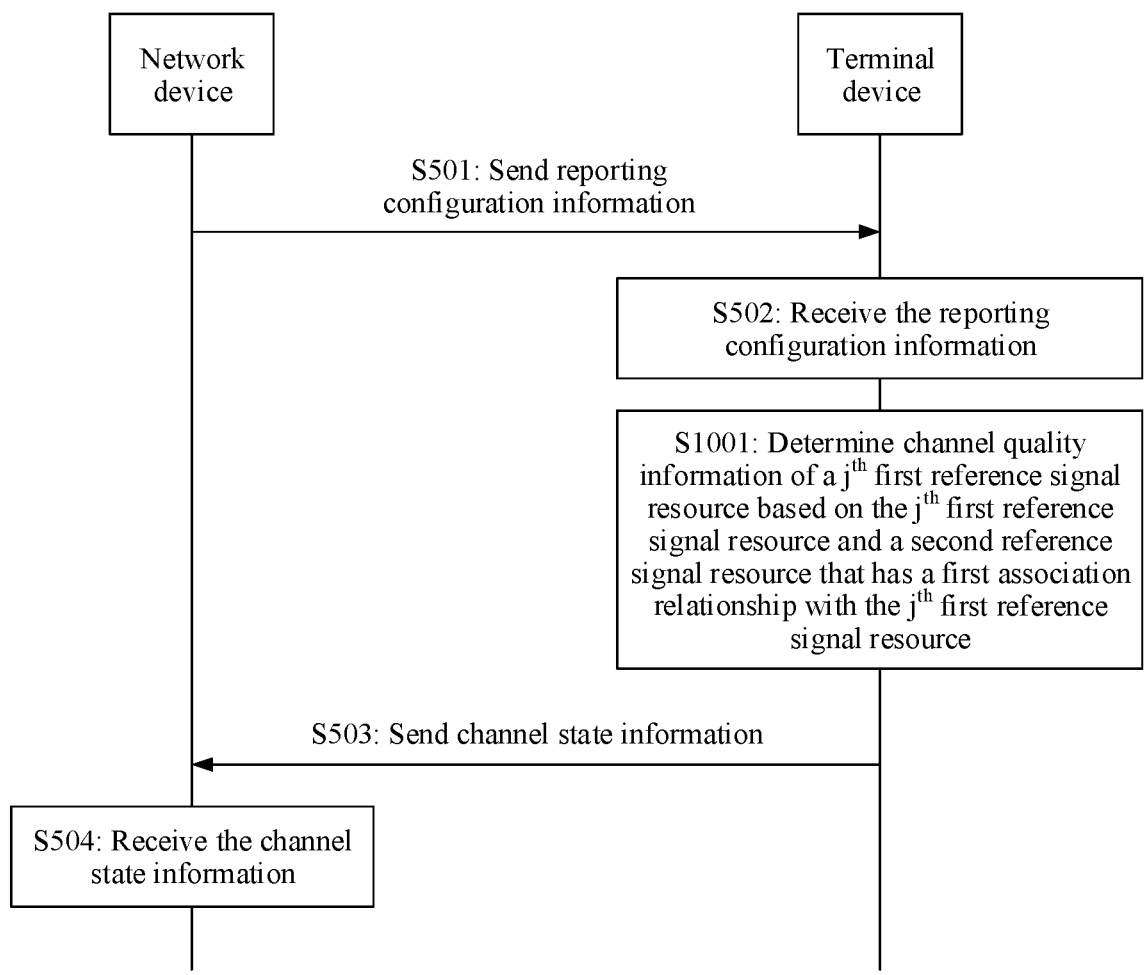
FIG. 10 is a flowchart of another channel state information transmission method according to an embodiment of this application.

In some embodiments, as shown in FIG. 10, for a $i^{th}$ first reference signal resource in the X first reference signal resources, S1001 may be performed before S503, that is, before the terminal device sends the channel state information to the network device. S1001: The terminal device determines channel quality information of the $i^{th}$ first reference signal resource based on the $j^{th}$ first reference signal resource and a second reference signal resource that has a first association relationship with the $j^{th}$ first reference signal resource. The $j^{th}$ first reference signal resource is one of the X first reference signal resources. In other words, the $j^{th}$ first reference signal resource may be any one of the X first reference signal resources.

Alternatively, "determining the channel quality information of the $i^{th}$ first reference signal resource" may be described as that the channel quality information of the $j^{th}$ first reference signal resource is determined based on the $j^{th}$ first reference signal resource and the second reference signal resource that has the first association relationship with the $j^{th}$ first reference signal resource.

Alternatively, "determining the channel quality information of the $j^{th}$ first reference signal resource" may be described as that the channel quality information of the $j^{th}$ first reference signal resource is determined on the basis of the $j^{th}$ first reference signal resource and the second reference signal resource that has the first association relationship with the $j^{th}$ first reference signal resource.

In some other embodiments, the terminal device may determine, based on another first reference signal resource in the X first reference signal resources, the second reference signal resource that has the first association relationship with the $j^{th}$ first reference signal resource.

The another first reference signal resource may be a resource that has a third association relationship with the $j^{th}$ first reference signal resource. The another first reference signal resource may be a part or all of the X first reference signal resources other than the $j^{th}$ first reference signal resource.

Optionally, the third association relationship may be predefined in a protocol or configured by the network device.

Optionally, the third association relationship may be a time domain association relationship or a frequency domain association relationship.

Optionally, the third association relationship may refer to simultaneous receiving. It may be understood that the another first reference signal resource is a first reference signal resource that can be received simultaneously with the $j^{th}$ first reference signal resource.

In some other embodiments, the terminal device may determine, based on a first reference signal resource that is in the X first reference signal resources and that is received simultaneously with the $j^{th}$ first reference signal resource, the second reference signal resource that has the first association relationship with the $j^{th}$ first reference signal resource.

Alternatively, the "determining the channel quality information of the $j^{th}$ first reference signal resource" may be described as that the second reference signal resource that has the first association relationship with the $j^{th}$ first reference signal resource is determined based on the first reference signal resource that is in the X first reference signal resources and that is received simultaneously with the $j^{th}$ first reference signal resource.

In some other embodiments, if the X first reference signal resources are received simultaneously, the first reference signal resource received simultaneously with the $j^{th}$ first reference signal resource is a first reference signal resource other than the $j^{th}$ first reference signal resource in the X first reference signal resources.

In some other embodiments, if the X first reference signal resources may be grouped into at least two reference signal resource groups, reference signal resources included in any reference signal resource group may be received simultaneously. The first reference signal resource received simultaneously with the $j^{th}$ first reference signal resource is a first reference signal resource other than the $j^{th}$ first reference signal resource in a reference signal resource group in which the $j^{th}$ first reference signal resource is located.

In some other embodiments, the terminal device may determine, based on a second reference signal resource that has the second association relationship with the simultaneously received first reference signal resource, the second reference signal resource that has the first association relationship with the $j^{th}$ first reference signal resource, where the simultaneously received first reference signal resource is the first reference signal resource that is received simultaneously with the $j^{th}$ first reference signal resource.

Alternatively, the "determining the second reference signal resource that has the first association relationship with the $j^{th}$ first reference signal resource" may be described as that the terminal device may determine, based on the second reference signal resource that has the second association relationship with the simultaneously received first reference signal resource, the second reference signal resource that has the first association relationship with the $j^{th}$ first reference signal resource, where the simultaneously received first reference signal resource is the resource that is received simultaneously with the $j^{th}$ first reference signal resource.

Alternatively, the "determining the second reference signal resource that has the first association relationship with the $j^{th}$ first reference signal resource" may be described as that the second reference signal resource that has the first association relationship with the $j^{th}$ first reference signal resource is a second reference signal resource that has the second association relationship with the simultaneously received first reference signal resource, and the simultaneously received first reference signal resource is the resource received simultaneously with the $j^{th}$ first reference signal resource.

The first association relationship may refer to a relationship between a CMR and an IMR that are used to measure one piece of channel quality information (for example, an L1-SINR). In some embodiments, the $j^{th}$ first reference signal resource and the second reference signal resource that has the first association relationship with the $j^{th}$ first reference signal resource satisfy a QCL relationship.

Because the second reference signal resource that has the second association relationship with the first reference signal resource may be used to estimate power information on the first reference signal resource, when the first reference signal resource is used as interference, the second reference signal resource that has the second association relationship with the first reference signal resource may simulate an interference signal. Therefore, more accurate interference information is obtained.

Figure 11:
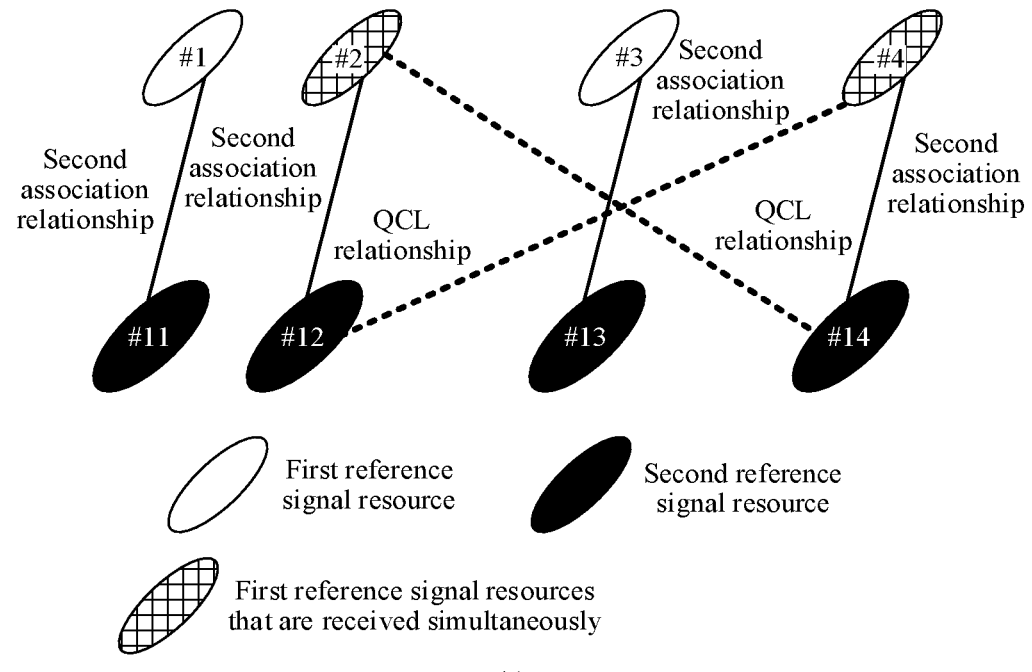
FIG. 11 is an example diagram of a first association relationship between resources according to an embodiment of this application.
Figure 11:
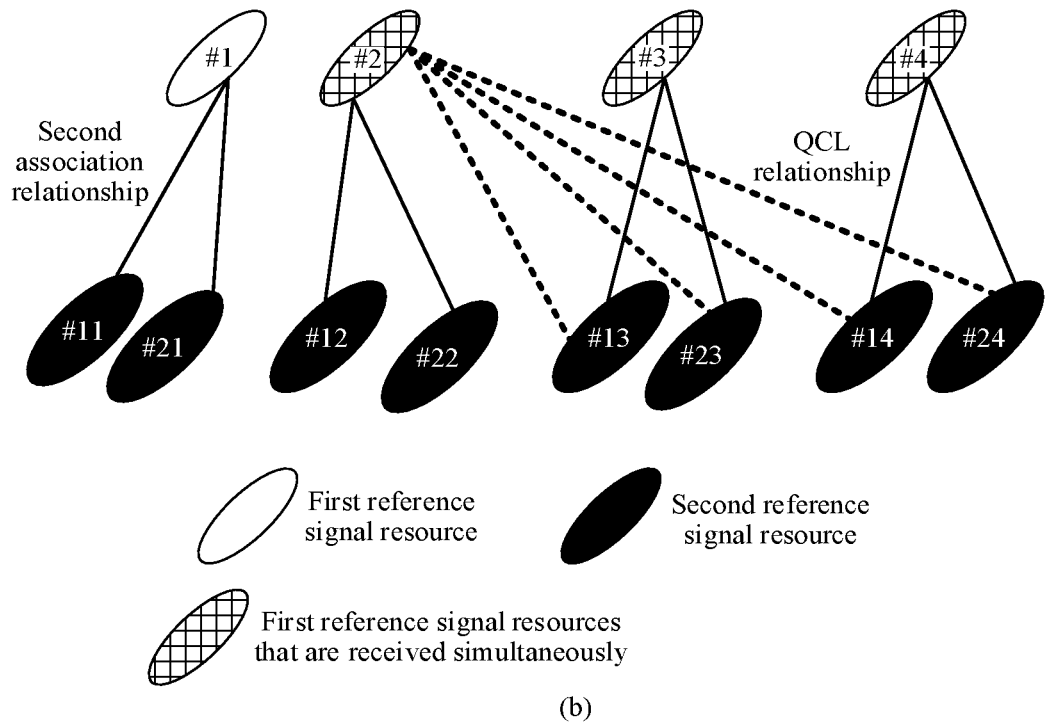

For example, as shown in (a) in FIG. 11, the network device configures, for the terminal device, four first reference signal resources and second reference signal resources that have the second association relationship with the first reference signal resources. The first reference signal resource may be a CSI-RS resource.

For convenience, #n is used to represent an $n^{th}$ first reference signal resource, and #xy is used to represent a $y^{th}$ second reference signal resource. Numbers of the four first reference signal resources are respectively #1, #2, #3, and #4. #1 indicates the $1^{st}$ first reference signal resource, #2 indicates the $2^{nd}$ first reference signal resource, #3 indicates the 3rd first reference signal resource, and #4 indicates the $4^{th}$ first reference signal resource. Numbers of the four second reference signal resources are respectively #11, #12, #13, and #14. #11 indicates the $1^{st}$ second reference signal resource, #12 indicates the $2^{nd}$ second reference signal resource, #13 indicates the $3^{rd}$ second reference signal resource, and #14 indicates the $4^{th}$ second reference signal resource.

For example, it is assumed that first reference signal resources that can be received simultaneously are the $2^{nd}$ first reference signal resource #2 and the $4^{th}$ second reference signal resource #4. In this case, interference information of the $2^{nd}$ first reference signal resource #2 is obtained by the terminal device by measuring the 4th second reference signal resource #14. In addition, the $2^{nd}$ first reference signal resource #2 and the $4^{th}$ second reference signal resource #14 satisfy the QCL relationship. Interference information of the $4^{th}$ first reference signal resource #4 is obtained by the terminal device by measuring the $2^{nd}$ second reference signal resource #12. In addition, the $4^{th}$ first reference signal resource #4 and the $2^{nd}$ second reference signal resource #12 satisfy the QCL relationship.

For another example, as shown in (b) in FIG. 11, the network device configures, for each first reference signal resource, two second reference signal resources that have the second association relationship with the first reference signal resource. It is assumed that first reference signal resources that can be received simultaneously are the $2^{nd}$ first reference signal resource #2, the $3^{rd}$ first reference signal resource #3, and the 4th first reference signal resource #4. In this case, interference information of the $2^{nd}$ first reference signal resource #2 may be obtained by the terminal device by measuring a second reference signal resource #13, a second reference signal resource #23, a second reference signal resource #14, and a second reference signal resource #24. In addition, the $2^{nd}$ first reference signal resource #2 and each of the second reference signal resource #13, the second reference signal resource #23, the second reference signal resource #14, and the second reference signal resource #24 satisfy the QCL relationship.

Similarly, interference information of the $3^{rd}$ first reference signal resource #3 may be obtained by the terminal device by measuring a second reference signal resource #12, a second reference signal resource #22, the second reference signal resource #14, and the second reference signal resource #24. In addition, the $3^{rd}$ first reference signal resource #3 and each of the second reference signal resource #12, the second reference signal resource #22, the second reference signal resource #14, and the second reference signal resource #24 satisfy the QCL relationship.

Similarly, interference information of the $4^{th}$ first reference signal resource #4 may be obtained by the terminal device by measuring the second reference signal resource #12, the second reference signal resource #22, the second reference signal resource #13, and the second reference signal resource #23. In addition, the $4^{th}$ first reference signal resource #4 and each of the second reference signal resource #12, the second reference signal resource #22, the second reference signal resource #13, and the second reference signal resource #23 satisfy the QCL relationship.

Figure 12:
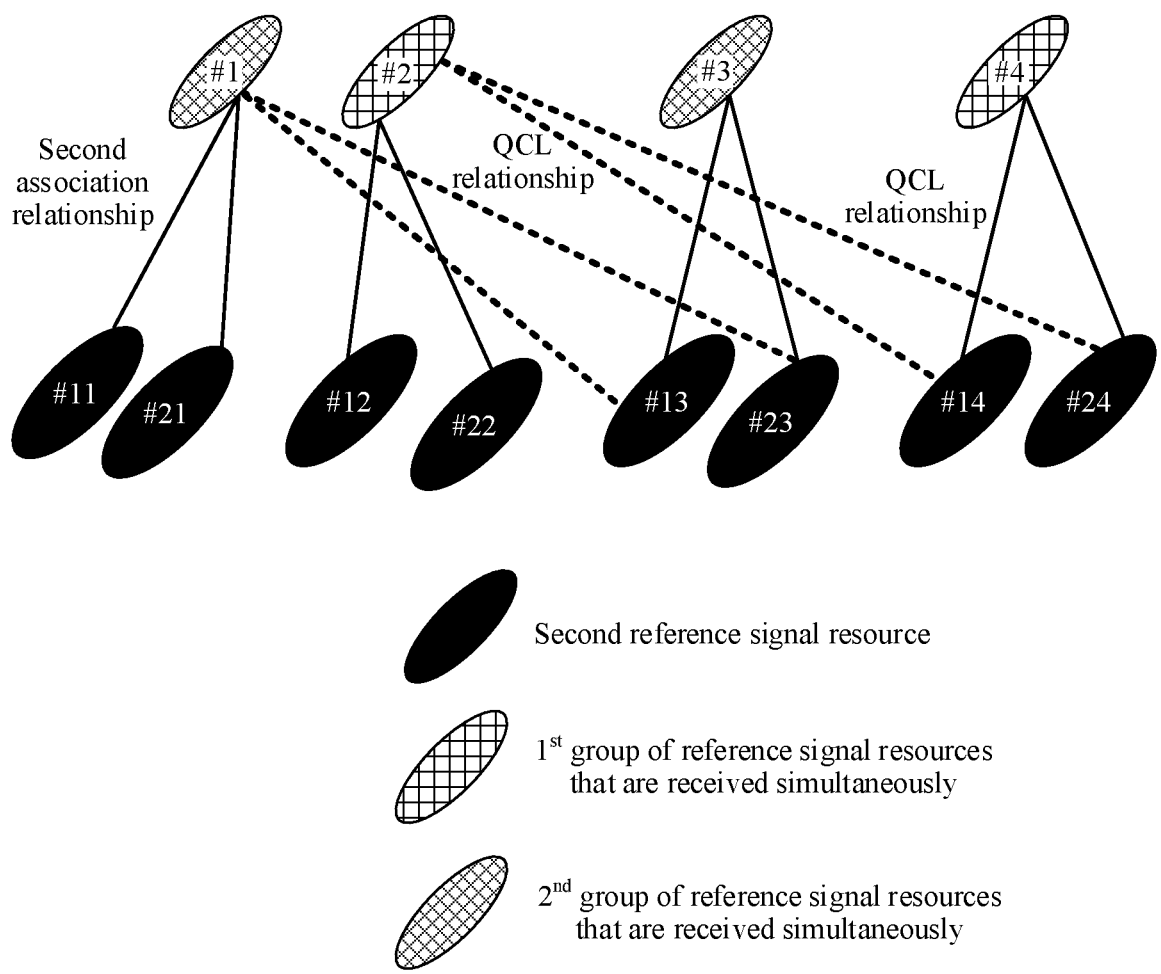
FIG. 12 is an example diagram of another first association relationship between resources according to an embodiment of this application.

For another example, as shown in FIG. 12, the network device configures, for each first reference signal resource, two second reference signal resources that have the second association relationship with the first reference signal resource. The $1^{st}$ first reference signal resource #1 and the $3^{rd}$ first reference signal resource #3 are the $1^{st}$ group of first reference signal resources that are received simultaneously. The $2^{nd}$ first reference signal resource #2 and the $4^{th}$ first reference signal resource #4 are the $2^{nd}$ group of first reference signal resources that are received simultaneously. In this case, interference information of the $1^{st}$ first reference signal resource #1 may be obtained by the terminal device by measuring a second reference signal resource #13 and a second reference signal resource #23. In addition, the $1^{st}$ first reference signal resource #1 and each of the second reference signal resource #13 and the second reference signal resource #23 satisfy the QCL relationship.

Similarly, interference information of the $3^{rd}$ first reference signal resource #1 may be obtained by the terminal device by measuring a second reference signal resource #11 and a second reference signal resource #21. In addition, the $3^{rd}$ first reference signal resource #3 and each of the second reference signal resource #11 and the second reference signal resource #21 satisfy the QCL relationship.

Similarly, interference information of the $2^{nd}$ first reference signal resource #2 may be obtained by the terminal device by measuring a second reference signal resource #14 and a second reference signal resource #24. In addition, the $2^{nd}$ first reference signal resource #2 and each of the second reference signal resource #14 and the second reference signal resource #24 satisfy the QCL relationship.

Similarly, interference information of the $4^{th}$ first reference signal resource #4 may be obtained by the terminal device by measuring the second reference signal resource #12 and the second reference signal resource #22. In addition, the $4^{th}$ first reference signal resource #4 and each of the second reference signal resource #12 and the second reference signal resource #22 satisfy the QCL relationship.

It should be understood that, for the method in FIG. 11 and FIG. 12, the terminal device may determine channel quality information of a first reference signal resource based on signal information obtained on the first reference signal resource and interference information obtained on a second reference signal resource that has the first association relationship with the first reference signal resource.

It should be understood that possible values of X and Y may be separately configured by the network device, indicated in a form of a combination (X, Y), or predefined in a protocol. X is a quantity of indexes of first reference signal resources reported by the terminal device, and Y is a quantity of pieces of channel quality information reported by the terminal device. Optionally, possible values of X and Y are as follows. For ease of description, the possible values of X and Y are represented in a form of (X, Y). The value may be one or more of the following: (2, 2), (2, 1), (4, 4), (4, 1), (4, 2), (3, 1), and (3, 3).

In addition, the quantity of pieces of channel state information reported by the terminal device depends on a configuration of the network device, predefinition in the protocol, or reporting of the terminal device. This is not limited in embodiments of this application. For example, if the network device configures the terminal device to report four pieces of channel state information, the terminal device reports the four pieces of channel state information. Information that may be included in each piece of channel state information is described above. Details are not described herein again.

The following describes how the terminal device determines the channel quality information of the $j^{th}$ first reference signal resource based on the $j^{th}$ first reference signal resource and the second reference signal resource that has the first association relationship with the $j^{th}$ first reference signal resource.

In some embodiments, the terminal device may use first signal quality measured on the $j^{th}$ first reference signal resource as a signal item, and use second signal quality measured on the second reference signal resource corresponding to the $j^{th}$ first reference signal resource as an interference item. The terminal device determines channel quality based on the signal item and the interference item, and uses the channel quality as content of the channel state information. The signal quality may be a signal power, for example, a reference signal received power (reference signal received power, RSRP). The signal quality may alternatively be a signal strength, for example, a reference signal received strength. The signal quality may alternatively be signal energy or the like. It should be understood that the signal power in embodiments of this application may be replaced with signal quality such as the signal strength, the signal energy, a signal to interference plus noise ratio (signal to interference plus noise ratio, SINR), a signal-to-noise ratio (signal-noise ratio, SNR), a channel quality indicator (channel quality indicator, CQI), or reference signal received quality (Reference signal received quality, RSRQ).

In an optional implementation, the terminal device may first obtain a first signal power and a second signal power. The first signal power is obtained based on a signal power on the $j^{th}$ first reference signal resource, and the first signal power may be the signal power on the $j^{th}$ first reference signal resource. The second signal power is obtained based on a signal power of the second reference signal on the second reference signal resource that has the first association relationship with the $j^{th}$ first reference signal resource, where the second signal power is the signal power of the second reference signal on the second reference signal resource that has the first association relationship with the $j^{th}$ first reference signal resource. Then, the first signal power may be used as a signal term, and the second signal power may be used as an interference term, to obtain channel quality. For example, the SINR is determined based on the first signal power and the second signal power, and the signal to interference plus noise ratio may be determined by using the following formula:

$$SINR = \frac{S}{I},$$

where S represents the first signal power, and I represents the second signal power.

For different second reference signal resources, values of the second signal power may also be different. For the different second reference signal resources, the following describes the values of the second signal power in detail.

Manner 1: When the second reference signal is CSI-IM, and the second reference signal resource is a resource of the CSI-IM, the second signal power is obtained based on an average value of receive powers of CSI-IM on second reference signal resources that have the first association relationship with the $j^{th}$ first reference signal resource. For example, the second signal power is the average value of the receive powers of the CSI-IM on the second reference signal resources that have the first association relationship with the $j^{th}$ first reference signal resource. For example, it is assumed that the $j^{th}$ first reference signal resource is the $2^{nd}$ first reference signal resource #2. As shown in (a) in FIG. 11, the first association relationship exists between the $2^{nd}$ first reference signal resource #2 and a $4^{th}$ second reference signal resource #14, and the second signal power is a receive power of CSI-IM on the $4^{th}$ second reference signal resource #14. As shown in (b) in FIG. 11, the first association relationship exists between the $2^{nd}$ first reference signal resource #2 and each of a second reference signal resource #13, a second reference signal resource #23, a second reference signal resource #14, and a second reference signal resource #24, the second signal power is an average value of a receive power of CSI-IM on the second reference signal resource #13, a receive power of CSI-IM on the second reference signal resource #23, a receive power of CSI-IM on the second reference signal resource #14, and a receive power of CSI-IM on the second reference signal resource #24. It should be noted that the average value of the receive powers of the CSI-IM may be an average value of values obtained after a ceiling operation or a rounding operation is performed on the receive powers of the CSI-IM. For example, the obtained receive powers of the CSI-IM include 3.1, 3.2, and 6.1, and an average value of 3, 3, and 6 may be calculated. That is, (3+3+1)/3=4. Alternatively, the average value of the receive powers of the CSI-IM may be an unquantized average value, a quantized average value, or the like. This is not limited in this application.

Manner 2: When the second reference signal is an NZP CSI-RS, and the second reference signal resource is a resource of the NZP CSI-RS, the second signal power is obtained based on a sum of signal powers of NZP CSI-RSs on second reference signal resources that have the first association relationship with the $j^{th}$ first reference signal resource. For example, the second signal power is the sum of the signal powers of the NZP CSI-RSs on the second reference signal resources that have the first association relationship with the $j^{th}$ first reference signal resource. For example, as shown in (b) in FIG. 11, the first association relationship exists between the $2^{nd}$ first reference signal resource #2 and each of a second reference signal resource #13, a second reference signal resource #23, a second reference signal resource #14, and a second reference signal resource #24, the second signal power is a sum of a signal power of an NZP CSI-RS on the second reference signal resource #13, a signal power of an NZP CSI-RS on the second reference signal resource #23, a signal power of an NZP CSI-RS on the second reference signal resource #14, and a signal power of an NZP CSI-RS on the second reference signal resource #24. It should be understood that the second signal power may alternatively be a sum of the signal powers of the NZP CSI-RSs and a residual power of the $j^{th}$ first reference signal resource. Alternatively, the second signal power may be a sum of {the signal powers of the NZP CSI-RSs} and {an average value of the residual power of the $j^{th}$ first reference signal resource and residual powers of the NZP CSI-RSs}. Alternatively, the second signal power may be a sum of {the signal powers of the NZP CSI-RSs} and {an average value of the residual powers of the NZP CSI-RS}. The residual power may be obtained by subtracting a channel estimation signal power from a total receive power of a resource, or the residual power may be a difference between {the total receive power on the resource} and {a signal power on the resource for reference signal channel estimation}.

Manner 3: The second reference signal resource in the L second reference signal resource sets includes an NZP CSI-RS resource and a CSI-IM resource, and the second signal power is obtained based on a receive power of the CSI-IM and a signal power of the NZP CSI-RS on the second reference signal resource that has the first association relationship with the $j^{th}$ first reference signal resource. For example, the second signal power is a sum of the receive power of the CSI-IM and the signal power of the NZP CSI-RS on the second reference signal resource that has the first association relationship with the $j^{th}$ first reference signal resource. For example, as shown in (b) in FIG. 11, the first association relationship exists between the $2^{nd}$ first reference signal resource #2 and each of a second reference signal resource #13, a second reference signal resource #23, a second reference signal resource #14, and a second reference signal resource #24. It is assumed that the second reference signal resource #13 and the second reference signal resource #23 are NZP CSI-RS resources, and the second reference signal resource #14 and the second reference signal resource #24 are CSI-IM resources. The second signal power is a sum of signal powers of NZP CSI-RSs on the second reference signal resource #13 and the second reference signal resource #23 plus an average value of receive powers of CSI-IM on the second reference signal resource #14 and the second reference signal resource #24. For a manner of calculating the receive power of the CSI-IM, refer to the descriptions in the foregoing manner 1. For a manner of calculating the signal power of the NZP CSI-RS, refer to the descriptions in the foregoing manner 2. Details are not described herein again in embodiments of this application. It should be understood that the receive power of the CSI-IM may refer to all receive powers of the CSI-IM resource. The signal power of the NZP CSI-RS may be a signal power obtained through NZP CSI-RS channel estimation.

In some embodiments, the terminal device obtains, based on a capability of the terminal device, a partial signal to interference plus noise ratio based on a part of first reference signal resources that are received simultaneously and a second reference signal resource corresponding to the part of the first reference signal resources. For example, there are four first reference signal resources that can be received simultaneously. The terminal device may measure the four first reference signal resources, and second reference signals corresponding to four first reference signals, to obtain four signal to interference plus noise ratios. Alternatively, the terminal device may measure two first reference signal resources, and second reference signals corresponding to two first reference signals, to obtain two signal to interference plus noise ratios.

Optionally, the terminal device may report a plurality of pieces of channel state information. Each piece of channel state information includes indexes of X first reference signal resources and Y pieces of channel quality information. For a method for reporting each piece of channel state information by the terminal device, refer to the foregoing descriptions. Details are not described again.

The index of the first reference signal resource may be an index corresponding to the first reference signal resource that carries the first reference signal. For example, the first reference signal resource set includes the M first reference signal resources. The terminal device reports the indexes of the X first reference signal resources. A value of M includes but is not limited to 64, 32, 16, 8, 4, or 2. A value of X is greater than or equal to 1 and less than or equal to M.

In some embodiments, the channel state information may further include an index of the second reference signal resource. The index of the second reference signal resource may be an index corresponding to a second reference signal resource that carries the second reference signal, for example, an index corresponding to the second reference signal resource that has the first association relationship with the $j^{th}$ first reference signal resource and that is in the second reference signal resource set. There may be a plurality of interference sources for one first reference signal, the terminal device may measure a plurality of types of interference for a plurality of second reference signal resources that have the first association relationship with the first reference signal resource. Therefore, the channel state information may include indexes of the plurality of second reference signal resources. For example, when multi-layer/multi-beam (multi-beam)/multi-TRP (for example, NCJT) transmission is supported, the terminal device may select a plurality of interference sources or an interference source used to measure different types of interference.

Optionally, the quantity of the indexes of the first reference signal resources reported by the terminal device may be preconfigured by the network device, predefined in the protocol, or reported by the terminal device. This is not limited in this application. Optionally, the quantity of the indexes of the first reference signal resources and a quantity of indexes of second reference signal resources reported by the terminal device may be preconfigured by the network device, predefined in the protocol, or reported by the terminal device. This is not limited in this application. Optionally, the terminal device reports only the index of the first reference signal resource and the channel quality information. Optionally, the terminal device may alternatively report an index of a first reference signal resource set to which a first reference signal belongs and an index of a second reference signal resource set to which a second reference signal belongs. For example, an index of one or more second reference signal resources is reported.

S504: The network device receives the channel state information sent by the terminal device.

The channel state information includes the indexes of the X first reference signal resources and the Y pieces of channel quality information, where X is an integer greater than or equal to 2, and Y is an integer greater than or equal to 1. The first reference signal resource is used for channel measurement.

The channel quality information of the $j^{th}$ first reference signal resource is determined based on the $j^{th}$ first reference signal resource and the second reference signal resource that has the first association relationship with the $j^{th}$ first reference signal resource. The $j^{th}$ first reference signal resource is one of the X first reference signal resources. In other words, the $j^{th}$ first reference signal resource is any one of the X first reference signal resources.

The second reference signal resource that has the first association relationship with the $j^{th}$ first reference signal resource is determined based on a first reference signal resource reported in a same group as the $j^{th}$ first reference signal resource, and the first reference signal resource reported in the same group as the $j^{th}$ first reference signal resource is a resource in the X first reference signal resources.

In other words, the second reference signal resource that has the first association relationship with the $j^{th}$ first reference signal resource is determined based on the first reference signal reported in the same group as the $j^{th}$ first reference signal resource.

For detailed explanations of the channel state information, refer to the descriptions of S503. Details are not described again.

According to the channel state information transmission method provided in embodiments of this application, for a channel measurement resource that is received when interference exists, the terminal device measures interference on the channel measurement resource based on a reference signal resource associated with at least one other channel measurement resource that can be received simultaneously with the channel measurement resource, to obtain more accurate interference information.

It may be understood that, to implement functions in the foregoing embodiments, the network device and the terminal device include corresponding hardware structures and/or software modules for performing the functions. A person of ordinary skill in the art should easily be aware that, in combination with the units and the method steps in the examples described in the embodiments disclosed in this application, this application can be implemented by hardware or a combination of hardware and computer software. Whether a function is performed by hardware or hardware driven by computer software depends on particular application scenarios and design constraints of the technical solutions.

Figure 13:
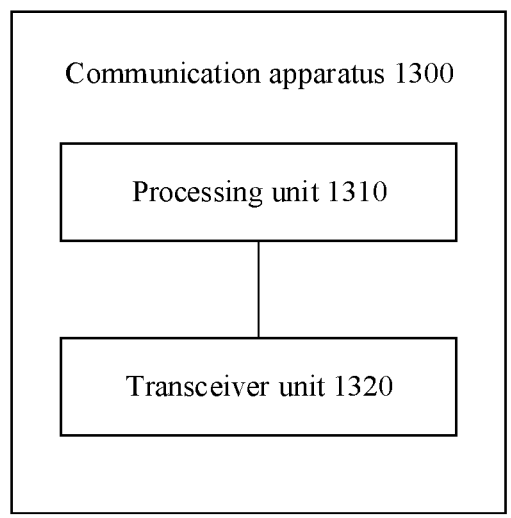
FIG. 13 is a schematic composition diagram of a communication apparatus according to an embodiment of this application.
Figure 14:
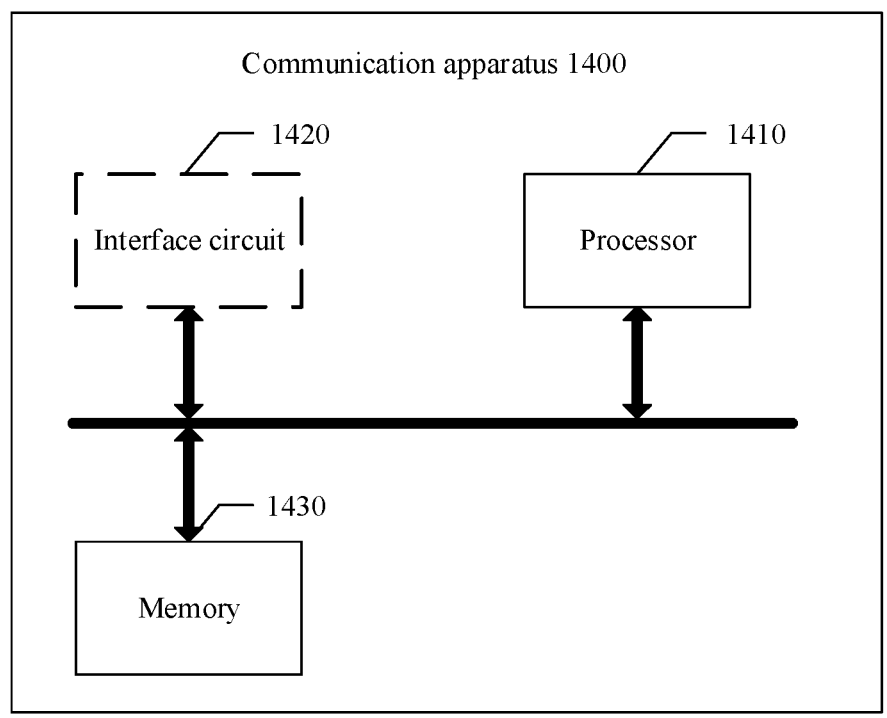
FIG. 14 is a schematic composition diagram of another communication apparatus according to an embodiment of this application.

FIG. 13 and FIG. 14 are schematic diagrams of possible communication apparatuses according to embodiments of this application. These communication apparatuses can be configured to implement functions of the terminal device or the network device in the foregoing method embodiments, and therefore can also implement beneficial effects of the foregoing method embodiments. In embodiments of this application, the communication apparatus may be the terminal device 303 or the terminal device 304 shown in FIG. 3, or may be the network device 302 shown in FIG. 3, or may be a module (for example, a chip) used in the terminal device or the network device.

As shown in FIG. 13, a communication apparatus 1300 includes a processing unit 1310 and a transceiver unit 1320. The communication apparatus 1300 is configured to implement functions of the terminal device or the network device in the method embodiment shown in FIG. 5 or FIG. 10.

When the communication apparatus 1300 is configured to implement the functions of the terminal device in the method embodiment shown in FIG. 5, the transceiver unit 1320 is configured to perform S502 and S503.

When the communication apparatus 1300 is configured to implement the functions of the network device in the method embodiment shown in FIG. 5, the transceiver unit 1320 is configured to perform S501 and S504.

When the communication apparatus 1300 is configured to implement the functions of the terminal device in the method embodiment shown in FIG. 10, the transceiver unit 1320 is configured to perform S502 and S503. The processing unit 1310 is configured to perform S1001.

When the communication apparatus 1300 is configured to implement the functions of the network device in the method embodiment shown in FIG. 10, the transceiver unit 1320 is configured to perform S501 and S504.

For more detailed descriptions of the processing unit 1310 and the transceiver unit 1320, directly refer to related descriptions in the method embodiments shown in FIG. 5 and FIG. 10. Details are not described herein.

As shown in FIG. 14, a communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to store instructions to be executed by the processor 1410, or store input data required by the processor 1410 to run the instructions, or store data generated after the processor 1410 runs the instructions.

When the communication apparatus 1400 is configured to implement the method shown in FIG. 5 or FIG. 10, the processor 1410 is configured to perform a function of the processing unit 1310, and the interface circuit 1420 is configured to perform a function of the transceiver unit 1320. The interface circuit 1420 may also be referred to as a transceiver (for example, a radio frequency module or an antenna).

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It should be noted that the processor in embodiments of this application may be a central processing unit (Central Processing Unit, CPU), may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instruction may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a network device or a terminal device. Certainly, the processor and the storage medium may exist in a network device or a terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid-state drive (solid-state drive, SSD).

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The symbol "I" in the text description of this application generally represents an "or" relationship between associated objects. In a formula of this application, the symbol "I" indicates a "division" relationship between associated objects.

It may be understood that various numbers in embodiments of this application are merely used for ease of distinguishing, and are not used to limit the scope of embodiments of this application. The sequence numbers of the foregoing processes do not mean an execution sequence, and the execution sequence of the processes should be determined according to functions and internal logic of the processes.

What is claimed is:

1. A channel state information transmission method, comprising:
receiving reporting configuration information, wherein the reporting configuration information indicates a reporting type, and the reporting type indicates group-based reporting; and
sending channel state information, wherein the channel state information comprises indexes of X first reference signal resources and Y pieces of channel quality information, X is an integer greater than or equal to 2, and Y is an integer greater than or equal to 1, wherein
channel quality information of a $j^{th}$ first reference signal resource is determined based on the $j^{th}$ first reference signal resource and a second reference signal resource that has a first association relationship with the $j^{th}$ first reference signal resource, the $j^{th}$ first reference signal resource is one of the X first reference signal resources, and j is an integer greater than or equal to 1 and less than or equal to X, wherein the $j^{th}$ first reference signal resource and the second reference signal resource that has the first association relationship with the $j^{th}$ first reference signal resource satisfy a quasi-colocation (QCL) relationship; and
the second reference signal resource that has the first association relationship with the $j^{th}$ first reference signal resource is determined based on a first reference signal resource received simultaneously with the $j^{th}$ first reference signal resource, and the first reference signal resource received simultaneously with the $j^{th}$ first reference signal resource is a resource in the X first reference signal resources.

2. The method according to claim 1, wherein that the second reference signal resource that has the first association relationship with the $j^{th}$ first reference signal resource is determined based on a first reference signal resource received simultaneously with the $j^{th}$ first reference signal resource comprises:
the second reference signal resource that has the first association relationship with the $j^{th}$ first reference signal resource is determined based on a second reference signal resource that has a second association relationship with the simultaneously received first reference signal resource, and the simultaneously received first reference signal resource is the first reference signal resource received simultaneously with the $j^{th}$ first reference signal resource.

3. The method according to claim 1, wherein the reporting configuration information further indicates a first reference signal resource set and L second reference signal resource sets, the first reference signal resource set comprises M first reference signal resources, the first reference signal resource is used for channel measurement, an $i^{th}$ second reference signal resource set comprises $N_i$ second reference signal resources, and the second reference signal resource is used for interference measurement, wherein M is an integer greater than 1, L is an integer greater than or equal to 1, i is an integer greater than or equal to 1 and less than or equal to L, and $N_i$ is an integer greater than or equal to 1.

4. The method according to claim 3, wherein a second association relationship exists between a $k^{th}$ first reference signal resource in the M first reference signal resources and at least one second reference signal resource in the L second reference signal resource sets, wherein k is an integer greater than or equal to 1 and less than or equal to M.

5. A channel state information transmission method, comprising:
sending reporting configuration information, wherein the reporting configuration information indicates a reporting type, and the reporting type indicates group-based reporting; and
receiving channel state information, wherein the channel state information comprises indexes of X first reference signal resources and Y pieces of channel quality information, X is an integer greater than or equal to 2, and Y is an integer greater than or equal to 1, wherein
channel quality information of a $j^{th}$ first reference signal resource is determined based on the $j^{th}$ first reference signal resource and a second reference signal resource that has a first association relationship with the $j^{th}$ first reference signal resource, and the $j^{th}$ first reference signal resource is one of the X first reference signal resources, wherein the $j^{th}$ first reference signal resource and the second reference signal resource that has the first association relationship with the $j^{th}$ first reference signal resource satisfy a quasi-colocation (QCL) relationship; and the second reference signal resource that has the first association relationship with the $j^{th}$ first reference signal resource is determined based on a first reference signal resource reported in a same group as the $j^{th}$ first reference signal resource, and the first reference signal resource reported in the same group as the $j^{th}$ first reference signal resource is a resource in the X first reference signal resources.

6. The method according to claim 5, wherein that the second reference signal resource that has the first association relationship with the $j^{th}$ first reference signal resource is determined based on a first reference signal resource reported in a same group as the $j^{th}$ first reference signal resource comprises:

the second reference signal resource that has the first association relationship with the $j^{th}$ first reference signal resource is determined based on a second reference signal resource that has a second association relationship with the first reference signal resource reported in the same group, and the first reference signal resource reported in the same group is the first reference signal resource reported in the same group as the $j^{th}$ first reference signal resource.

7. The method according to claim 5, wherein the reporting configuration information further indicates a resource configuration, the resource configuration indicates a first reference signal resource set and L second reference signal resource sets, the first reference signal resource set comprises M first reference signal resources, the first reference signal resource is used for channel measurement, an $i^{th}$ second reference signal resource set comprises $N_i$ second reference signal resources, and the second reference signal resource is used for interference measurement, wherein M is an integer greater than 1, L is an integer greater than or equal to 1, i is an integer greater than or equal to 1 and less than or equal to L, and Na is an integer greater than or equal to 1.

8. The method according to claim 7, wherein a second association relationship exists between a $k^{th}$ first reference signal resource in the M first reference signal resources and at least one second reference signal resource in the L second reference signal resource sets, wherein k is an integer greater than or equal to 1 and less than or equal to M.

9. A communication apparatus, comprising:
a transceiver;
at least one processor; and
one or more memories coupled to the at least one processor and storing programming instructions for execution by the at least one processor to cause the transceiver to:
receive reporting configuration information, wherein the reporting configuration information indicates a reporting type, and the reporting type indicates group-based reporting, and;
send channel state information, wherein the channel state information comprises indexes of X first reference signal resources and Y pieces of channel quality information, X is an integer greater than or equal to 2, and Y is an integer greater than or equal to 1, wherein
channel quality information of a $j^{th}$ first reference signal resource is determined based on the $j^{th}$ first reference signal resource and a second reference signal resource that has a first association relationship with the $j^{th}$ first reference signal resource, the $j^{th}$ first reference signal resource is one of the X first reference signal resources, and j is an integer greater than or equal to 1 and less than or equal to X, wherein the $j^{th}$ first reference signal resource and the second reference signal resource that has the first association relationship with the $i^{th}$ first reference signal resource satisfy a quasi-colocation (QCL) relationship; and the second reference signal resource that has the first association relationship with the $j^{th}$ first reference signal resource is determined based on a first reference signal resource received simultaneously with the $j^{th}$ first reference signal resource, and the first reference signal resource received simultaneously with the $j^{th}$ first reference signal resource is a resource in the X first reference signal resources.

10. The apparatus according to claim 9, wherein that the second reference signal resource that has the first association relationship with the $j^{th}$ first reference signal resource is determined based on a first reference signal resource received simultaneously with the $j^{th}$ first reference signal resource comprises:

the second reference signal resource that has the first association relationship with the $j^{th}$ first reference signal resource is determined based on a second reference signal resource that has a second association relationship with the simultaneously received first reference signal resource, and the simultaneously received first reference signal resource is the first reference signal resource received simultaneously with the $j^{th}$ first reference signal resource.

11. The apparatus according to claim 9, wherein the reporting configuration information further indicates a first reference signal resource set and L second reference signal resource sets, the first reference signal resource set comprises M first reference signal resources, the first reference signal resource is used for channel measurement, an $i^{th}$ second reference signal resource set comprises $N_i$ second reference signal resources, and the second reference signal resource is used for interference measurement, wherein M is an integer greater than 1, L is an integer greater than or equal to 1, i is an integer greater than or equal to 1 and less than or equal to L, and $N_i$ is an integer greater than or equal to 1.

12. The apparatus according to claim 11, wherein a second association relationship exists between a $k^{th}$ first reference signal resource in the M first reference signal resources and at least one second reference signal resource in the L second reference signal resource sets, wherein k is an integer greater than or equal to 1 and less than or equal to M.

* * * * *

UNITED STATES PATENT AND TRADEMARK OFFICE
CERTIFICATE OF CORRECTION

PATENT NO. : 12,225,399 B2
APPLICATION NO. : 17/719709
DATED : February 11, 2025
INVENTOR(S) : Di Zhang Page 1 of 1

It is certified that error appears in the above-identified patent and that said Letters Patent is hereby corrected as shown below:

In the Claims

In Column 45, In Line 36, In Claim 7, delete "Na" and insert -- $N_i$ --.

In Column 46, In Line 12 (Approx.), In Claim 9, delete "$i^{th}$" and insert -- $j^{th}$ --.

Signed and Sealed this
Fifteenth Day of July, 2025

Coke Morgan Stewart
*Acting Director of the United States Patent and Trademark Office*